(12) United States Patent
Okamoto et al.

(10) Patent No.: US 8,696,344 B2
(45) Date of Patent: Apr. 15, 2014

(54) MOLDING METHOD AND MOLDING APPARATUS

(75) Inventors: Eiji Okamoto, Matsumoto (JP); Toshimitsu Hirai, Hokuto (JP); Kohei Ishida, Suwa (JP)

(73) Assignee: Seiko Epson Corporation (JP)

( * ) Notice: Subject to any disclaimer, the term of this patent is extended or adjusted under 35 U.S.C. 154(b) by 275 days.

(21) Appl. No.: 13/037,587

(22) Filed: Mar. 1, 2011

(65) Prior Publication Data

US 2011/0215506 A1    Sep. 8, 2011

(30) Foreign Application Priority Data

Mar. 2, 2010    (JP) ................................. 2010-045000

(51) Int. Cl.
*B29C 67/02* (2006.01)

(52) U.S. Cl.
USPC ........ 425/375; 425/174.4; 264/113; 264/308; 264/405; 264/446; 264/482; 264/483; 264/494; 427/510; 427/558; 427/595; 427/508; 427/553

(58) Field of Classification Search
USPC ............... 425/174.4, 375; 264/113, 308, 400, 264/401, 405, 497, 446, 482, 483, 494; 427/510, 558, 595, 596, 508, 553
See application file for complete search history.

(56) References Cited

U.S. PATENT DOCUMENTS

| 7,794,799 | B1* | 9/2010 | Kim et al. ...................... | 427/532 |
| 2002/0008335 | A1* | 1/2002 | Leyden et al. ................ | 264/494 |
| 2005/0042430 | A1* | 2/2005 | Toyoda ......................... | 428/209 |
| 2008/0124475 | A1* | 5/2008 | Kritchman .................. | 427/421.1 |
| 2010/0215856 | A1* | 8/2010 | Kritchman .................... | 427/277 |

FOREIGN PATENT DOCUMENTS

| JP | 10-034752 | 2/1998 |
| JP | 2005-353728 A | 12/2005 |

* cited by examiner

*Primary Examiner* — Joseph S. Del Sole
*Assistant Examiner* — Lawrence D Hohenbrink, Jr.
(74) *Attorney, Agent, or Firm* — Harness, Dickey & Pierce, P.L.C.

(57) ABSTRACT

A molding method includes: drawing cross-section elements of a three-dimensional object as a molding target on a drawing surface of a drawing stand with a liquid whose curing is precipitated by receiving activation energy as cross-section patterns; applying the activation energy to the liquid configuring the cross-section patterns in a state in which the cross-section patterns is pinched between the drawing stand and a molding stand; and detaching the cross-section patterns after being applied with the activation energy from the drawing stand and transferring the cross-section patterns to the molding stand side, wherein the drawing surface has a liquid repellent area that is an area representing liquid repellency for the liquid and a lyophilic area that is independently formed in an island shape within the liquid repellent area and is an area representing lyophillicity stronger than that of the liquid repellent area for the liquid.

5 Claims, 19 Drawing Sheets

MOLDING METHOD AND MOLDING APPARATUS

BACKGROUND

1. Technical Field

The present invention relates to a molding method, a molding apparatus, and the like.

2. Related Art

Generally, as a method of molding a three-dimensional object (a molding method), a lamination method is known (for example, see JP-A-10-34752).

According to the lamination method, generally, a three-dimensional object is molded by sequentially laminating cross-section patterns and forming a plurality of cross-section elements that define the outer shape of the three-dimensional object.

In JP-A-10-34752 described above, as a method of forming the cross-section pattern, the following method is disclosed.

In this method, first, a cross-section element is drawn on a temporary table, which is coated with fluoride, as a cross-section pattern with an ultraviolet curable resin. Next, the cross-section pattern is irradiated with ultraviolet rays (ultraviolet light) in the state in which the cross-section pattern is pinched by the temporary table and a molding table. Next, the cross-section pattern and the temporary table are separated from each other. In this method, when the cross-section pattern is irradiated with the ultraviolet rays, the cross-section pattern is cured in a state of being bonded to the molding table. In addition, since the temporary table is coated with fluoride, the cross-section pattern can be easily detached from the temporary table. According to this method, the cross-section pattern can be easily transferred onto the molding table.

However, according to the method disclosed in JP-A-10-34752, since the temporary table is coated with fluoride, it may be difficult for the ultraviolet curable resin in a liquid state to spread on the temporary table depending on the viscosity of the ultraviolet curable resin. In this state, it is difficult to increase the precision of the cross-section pattern.

In other words, according to the general molding method, there is a problem in that it is difficult to increase the precision of a molding object.

SUMMARY

An advantage of some aspects of the invention is to solve at least a part of the problems described above, and the invention can be implemented in the following forms or application examples.

Application Example 1

According to this application example, there is provided a molding method including dividing a three-dimensional object as a molding target into a plurality of cross-section elements and drawing the cross-section elements as cross-section patterns on a drawing surface of a drawing stand having the drawing surface with a liquid whose curing is precipitated by receiving activation energy; applying the activation energy to the liquid configuring the cross-section patterns in a state in which the cross-section patterns drawn on the drawing stand is pinched between the drawing stand and a molding stand; and detaching the cross-section patterns after being applied with the activation energy from the drawing stand and transferring the cross-section patterns to the molding stand side. In the dividing of a three-dimensional object and the drawing of the cross-section elements, the cross-section patterns are drawn on the drawing surface that has a liquid repellent area that is an area representing liquid repellency for the liquid and a lyophilic area that is independently formed in an island shape within the liquid repellent area and is an area representing lyophillicity stronger than that of the liquid repellent area for the liquid.

The molding method according to this application example includes the dividing of a three-dimensional object and drawing of cross-section elements, the applying of activation energy, and the detaching of the cross-section patterns. In the dividing of a three-dimensional object and drawing of the cross-section elements, a three-dimensional object as a molding target is divided into a plurality of cross-section elements, and the cross-section elements are drawn on a drawing surface of a drawing stand with a liquid as cross-section patterns. Curing of the liquid is precipitated by receiving activation energy.

In the applying of the activation energy, the activation energy is applied to the liquid configuring the cross-section patterns in a state in which the cross-section patterns drawn on the drawing stand is pinched between the drawing stand and a molding stand. Accordingly, curing of the cross-section patterns pinched between the drawing stand and the molding stand is precipitated.

In the detaching of the cross-section patterns, the cross-section patterns are detached from the drawing stand, and the cross-section patterns are transferred to the molding stand side.

Accordingly, a plurality of the cross-section patterns can be laminated on the molding stand side. As a result, the three-dimensional object as a molding target can be formed on the molding stand.

According to this molding method, in the dividing of a three-dimensional object and drawing of the cross-section elements, the cross-section patterns are drawn on the drawing surface having a liquid repellent area and a lyophilic area. The liquid repellent area is an area representing liquid repellency for the liquid. The lyophilic area is an area representing lyophillicity stronger than that of the liquid repellent area for the liquid. The lyophilic area is independently formed in an island shape within the liquid repellent area.

Since the drawing surface has the liquid repellent area, in the detaching of the cross-section patterns, the cross-section patterns can be easily detached from the drawing stand. In addition, since the lyophilic area is independently formed in an island shape within the liquid repellent area, when the drawing surface is coated with the liquid, the liquid can be easily maintained in the lyophilic area. Accordingly, the precision of the cross-section patterns at a time when the cross-section patterns are drawn in the liquid repellent area with the liquid can be easily increased. As a result, the precision of the three-dimensional object as a molding target can be easily increased.

Application Example 2

In the above-described molding method, the liquid has photo curability that is a property of being precipitated to be cured by receiving irradiation of light, and, in the applying of the activation energy, the liquid is irradiated with the light.

According to this application example, the liquid has photo curability. The photo curability is a property of being precipitated to be cured by receiving irradiation of light. In the applying of the activation energy, the liquid is irradiated with light. Accordingly, curing of the liquid configuring the cross-section patterns can be precipitated.

Application Example 3

In the above-described molding method, in the dividing of a three-dimensional object and the drawing of the cross-section elements, the cross-section patterns are drawn on the drawing surface by ejecting the liquid to the drawing stand using an ink jet method.

In this application example, in the dividing of a three-dimensional object and drawing of cross-section elements, the cross-section patterns are drawn on the drawing surface by ejecting the liquid to the drawing stand using an ink jet method. Accordingly, the cross-section patterns can be drawn on the drawing surface.

Application Example 4

According to this application example, there is provided a molding apparatus including: an ejection head that ejects a liquid whose curing is precipitated by receiving activation energy; a drawing stand that has a drawing surface that is a surface on which cross-section patterns of a three-dimensional object as a molding target are drawn with the liquid ejected from the ejection head; an energy applying device that applies activation energy to the liquid adhering to the drawing surface; and a molding stand on which the cross-sectional patterns after being applied with the activation energy are transferred from the drawing stand. On the drawing surface, a liquid repellent area that is an area representing liquid repellency for the liquid and a lyophilic area that is independently formed in an island shape within the liquid repellent area and is an area representing lyophillicity stronger than that of the liquid repellent area for the liquid are arranged.

The molding apparatus of this application example includes: an ejection head; a drawing stand; an energy applying device; and a molding stand.

The ejection head ejects a liquid whose curing is precipitated by receiving activation energy.

The drawing stand has a drawing surface. The drawing surface is a surface on which cross-section patterns of a three-dimensional object as a molding target are drawn with the liquid ejected from the ejection head.

The energy applying device applies activation energy to the liquid adhering to the drawing surface. The cross-section patterns are transferred to the molding stand from the drawing stand.

In this molding apparatus, a liquid repellent area and a lyophilic area are disposed on the drawing surface. The liquid repellent area is an area representing liquid repellency for the liquid. The lyophilic area is an area representing lyophillicity stronger than that of the liquid repellent area for the liquid. The lyophilic area is independently formed in an island shape within the liquid repellent area.

Since the liquid repellent area is arranged on the drawing surface in the molding apparatus, the cross-section patterns can be easily detached from the drawing stand. In addition, since the lyophilic area is independently formed in an island shape within the liquid repellent area, when the drawing surface is coated with the liquid, the liquid can be easily maintained in the lyophilic area. Accordingly, the precision of the cross-section patterns at a time when the cross-section patterns are drawn in the liquid repellent area with the liquid can be easily increased. As a result, the precision of the three-dimensional object as a molding target can be easily increased.

Application Example 5

In the above-described molding apparatus, the liquid has photo curability that is a property of being precipitated to be cured by receiving irradiation of light, and the energy applying device irradiates the liquid with the light.

According to this application example, the liquid has photo curability. The photo curability is a property of being precipitated to be cured by receiving irradiation of light. The energy applying device irradiates the liquid with light. Accordingly, curing of the liquid configuring the cross-section patterns can be precipitated.

Application Example 6

In the above-described molding apparatus, the ejection head ejects the liquid in a liquid droplet state.

In this application example, since the ejection head ejects the liquid in a liquid droplet state, the cross-section patterns can be drawn with the liquid.

Application Example 7

In the above-described molding apparatus, a plurality of the lyophilic areas is disposed within the liquid repellent area, the plurality of the lyophilic areas configures a plurality of first arrangements arranged in a first direction in the plan view, and the plurality of the first arrangements is aligned in a second direction that is a direction intersecting the first direction in the plan view.

In this application example, a plurality of the lyophilic areas is disposed within the liquid repellent area. The plurality of the lyophilic areas configures a plurality of first arrangements arranged in a first direction in the plan view. The plurality of the first arrangements is aligned in a second direction that is a direction intersecting the first direction in the plan view.

According to the above-described configuration, since the plurality of the lyophilic areas is regularly scattered, the precision of the cross-section patterns can be easily increased while the detachability of the cross-section patterns from the drawing stand is maintained.

Application Example 8

In the above-described molding apparatus, a plurality of the lyophilic areas is disposed within the liquid repellent area, the plurality of the lyophilic areas configures a plurality of first arrangements arranged in a first direction in the plan view, and the plurality of the first arrangements is aligned in a zigzag pattern in a second direction that is a direction intersecting the first direction in the plan view.

In this application example, a plurality of the lyophilic areas is disposed within the liquid repellent area. The plurality of the lyophilic areas configures a plurality of first arrangements arranged in a first direction in the plan view. The plurality of the first arrangements is aligned in a zigzag pattern in a second direction that is a direction intersecting the first direction in the plan view.

According to the above-described configuration, since the plurality of the lyophilic areas is regularly scattered, the precision of the cross-section patterns can be easily increased while the detachability of the cross-section patterns from the drawing stand is maintained.

Application Example 9

In the above-described molding apparatus, a plurality of the lyophilic areas is disposed within the liquid repellent area, and the plurality of the lyophilic areas configures a spire using a Fibonacci sequence.

In this application example, a plurality of the lyophilic areas is disposed within the liquid repellent area. The plurality of the lyophilic areas configures a spire using a Fibonacci sequence.

According to the above-described configuration, since the plurality of the lyophilic areas is scattered, the precision of the cross-section patterns can be easily increased while the detachability of the cross-section patterns from the drawing stand is maintained.

In addition, according to this molding apparatus, in a two-dimensional coordinate system in the plan view, the linear regularity of the plurality of the lyophilic areas can be easily resolved. As a result, the precision of the cross-section patterns can be easily increased.

Application Example 10

In the above-described molding apparatus, the lyophilic areas protrude from the liquid repellent area.

Application Example 11

In the above-described molding apparatus, a gap size between the lyophilic areas adjacent to each other is a distance equal to or less than 1.25 times an outer diameter of the liquid droplet that is ejected from the ejection head.

In this application example, the gap size between the lyophilic areas adjacent to each other is a distance equal to or less than 1.25 times the outer diameter of the liquid droplet that is ejected from the ejection head. Accordingly, when the liquid droplet ejected from the ejection head lands on a space between the lyophilic areas adjacent to each other, a dot formed by the landed liquid droplet can be easily maintained in the gap between two lyophilic areas adjacent to each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
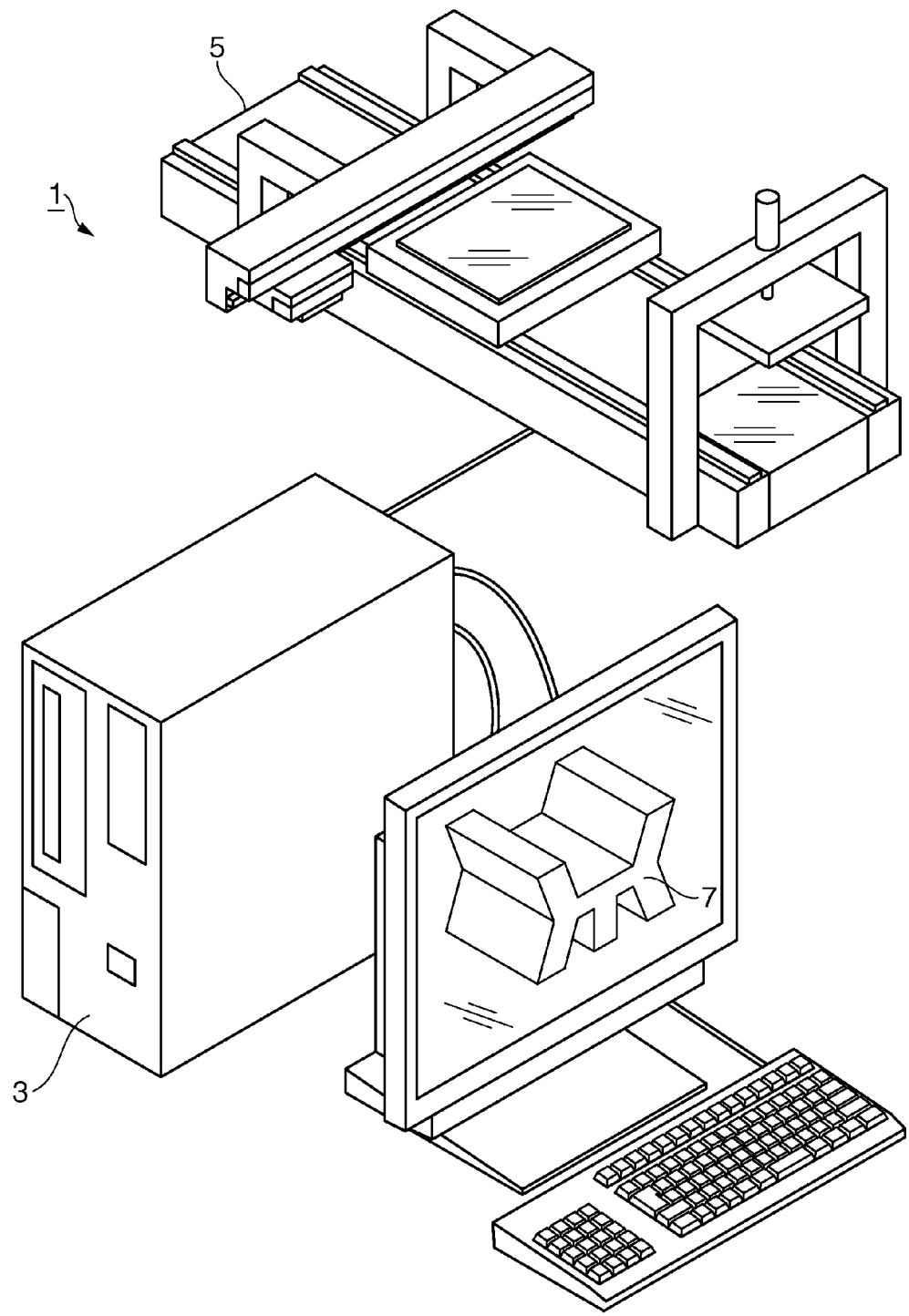
FIG. 1 is a perspective view showing the schematic configuration of a molding system according to this embodiment.

Embodiments of the invention will be described with reference to the accompanying drawings. In the drawings, in order to size each configuration to be recognizable, the scales of the configuration and the members thereof may be differently set.

A molding system 1 according to this embodiment, as shown in FIG. 1, includes a computer 3 and a molding apparatus 5.

The computer 3 performs a calculation process for extracting a plurality of cross-section elements from shape data of a three-dimensional object 7 that is a molding target. In addition, the computer 3 outputs data of the extracted cross-section elements (hereinafter, referred to as cross-section data) to the molding apparatus 5.

The molding apparatus 5 molds the three-dimensional object 7 by drawing cross-section patterns corresponding to the cross-section elements based on the cross-section data output from the computer 3 and sequentially laminating the drawn cross-section patterns.

Figure 2:
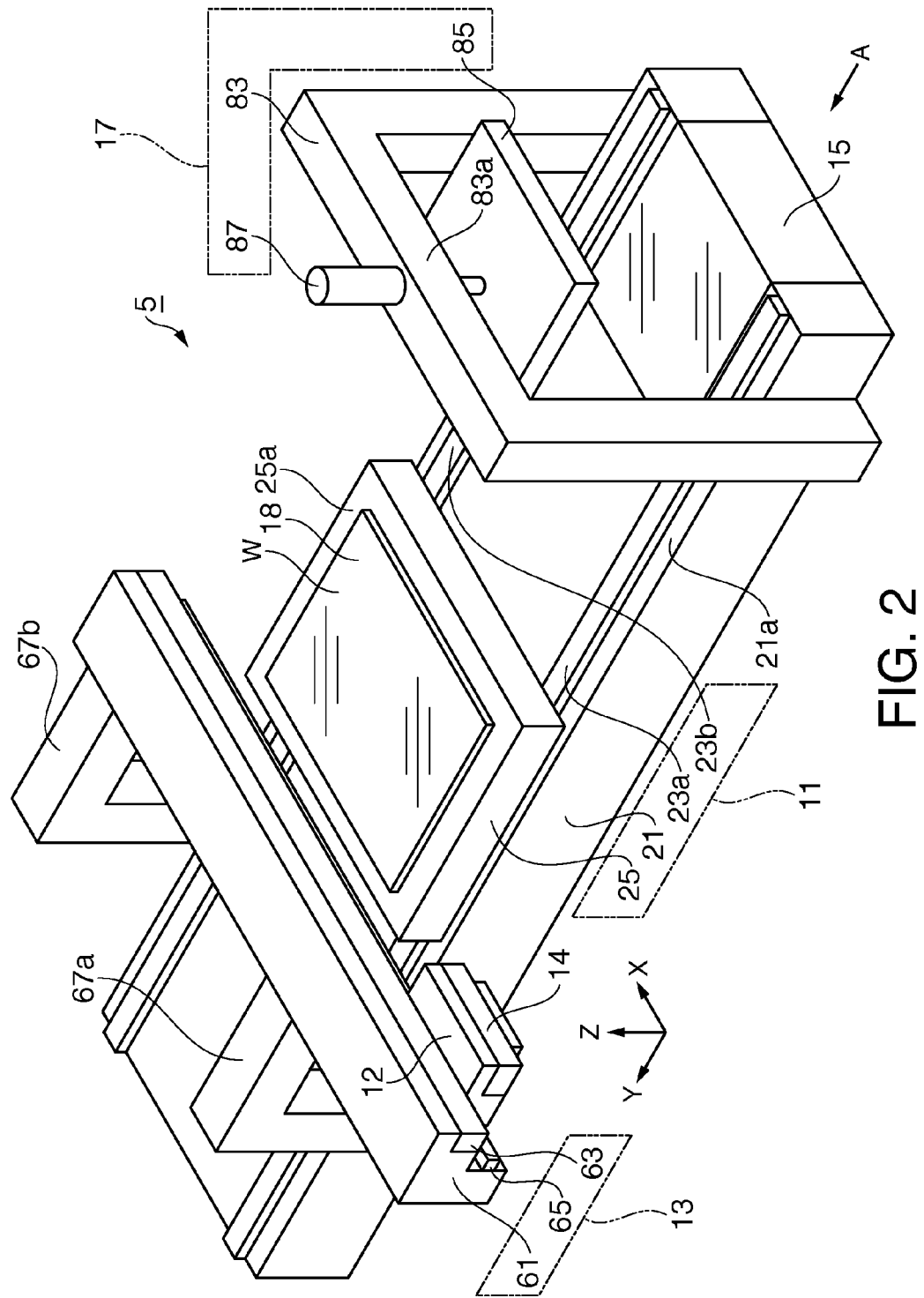
FIG. 2 is a perspective view showing the schematic configuration of a molding apparatus according to this embodiment.

The molding apparatus 5 according to this embodiment, as shown in FIG. 2 that is a perspective view representing the schematic configuration thereof, includes a substrate transporting device 11, a carriage 12, a carriage transporting device 13, an exposure device 15, and a transfer device 17.

In the carriage 12, a head unit 14 is disposed.

In the molding apparatus 5, a desired pattern can be drawn on a drawing surface 18 of a substrate W by ejecting a liquid as a liquid droplet from the head unit 14 while changing a relative position between the head unit 14 and the substrate W in the plan view. In this embodiment, the molding apparatus 5 draws a cross-section pattern on the substrate W based on the cross-section data that is output from the computer 3 (FIG. 1).

In the figure, the Y direction represents the movement direction of the substrate W, and the X direction represents a direction perpendicular to the Y direction in the plan view. In addition, a direction that is perpendicular to an XY plane defined by the X direction and the Y direction is defined as the Z direction.

The substrate transporting device 11, as shown in FIG. 2, includes a surface plate 21, a guide rail 23*a*, a guide rail 23*b*, and a table 25.

The surface plate 21 is configured by a material having a small coefficient of thermal expansion such as a stone and is installed so as to expand in the Y direction. The guide rail 23*a* and the guide rail 23*b* are installed on the top face 21*a* of the surface plate 21. The guide rail 23*a* and the guide rail 23*b* extend in the Y direction. The guide rail 23*a* and the guide rail 23*b* are parallel to each other with a gap therebetween being open toward the X direction.

The table 25 is disposed in a state of facing the top face 21*a* of the surface plate 21 with the guide rail 23*a* and the guide rail 23*b* interposed therebetween. The table 25 is mounted on the guide rail 23*a* and the guide rail 23*b* in a state of being floated from the surface plate 21. The table 25 includes a mounting surface 25*a* on which the substrate W is mounted. The mounting surface 25*a* faces the side (upper side) opposite to the surface plate 21 side. The table 25 is guided along the Y direction by the guide rail 23*a* and the guide rail 23*b* and is configured so as to reciprocate along the Y direction on the surface plate 21.

The table 25 is configured so as to be able to reciprocate by using a movement mechanism and a power source, which are not shown in the figure, in the Y direction. As the movement mechanism, for example, a mechanism acquired by combining a ball screw and a ball nut, a linear guide mechanism, or the like can be employed. In this embodiment, as the power source used for moving the table 25 in the Y direction, a substrate transporting motor to be described later is used. As the substrate transporting motor, various motors such as a stepping motor, a servo motor, and a linear motor can be used.

The power is transferred from the substrate transporting motor to the table 25 through the movement mechanism. Accordingly, the table 25 can reciprocate along the guide rail 23*a* and the guide rail 23*b*, that is, along the Y direction. In other words, the substrate transporting device 11 can allow the substrate W mounted on the mounting surface 25*a* of the table 25 to reciprocate in the Y direction. In addition, the substrate transporting device 11 includes a table position detecting device to be described later. The table position detecting device detects the position of the table 25 in the Y direction. Based on a result of the detection operation of the table position detecting device, the position of the substrate W in the Y direction can be acquired.

Figure 3:
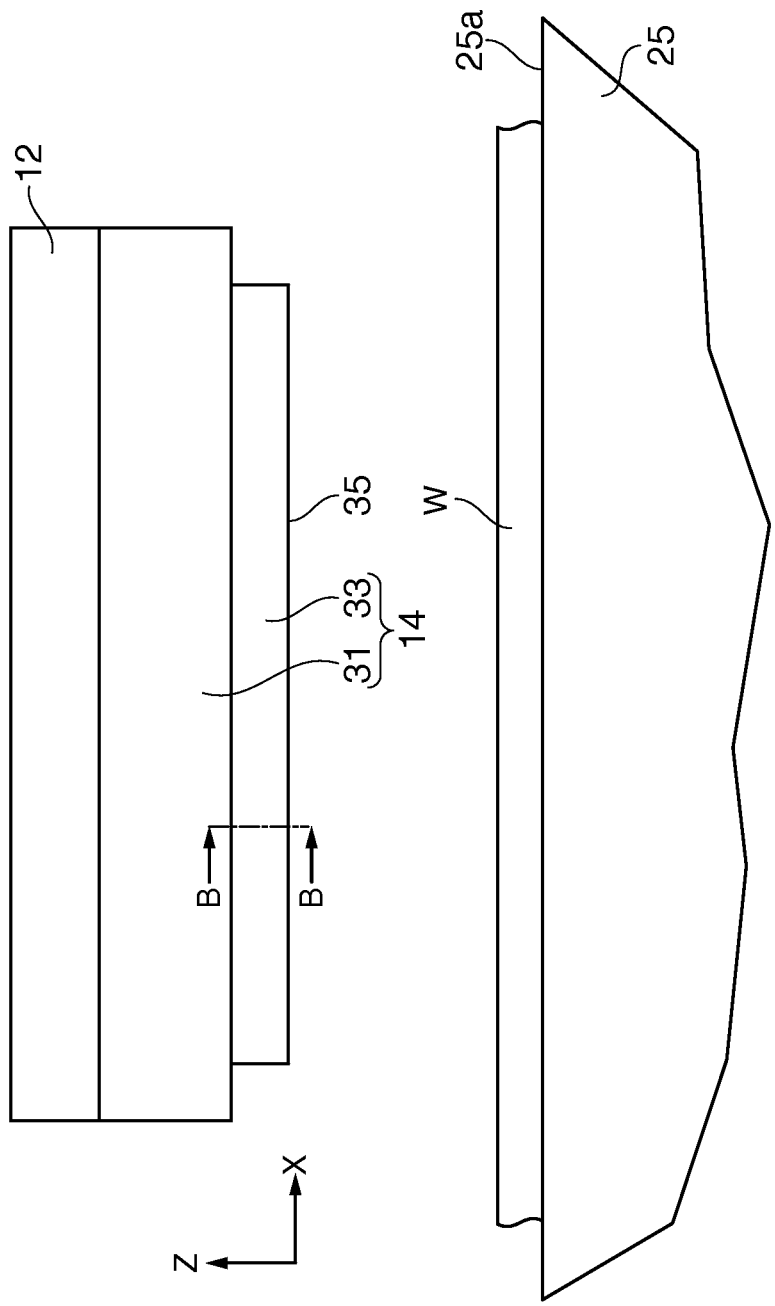
FIG. 3 is a front view when a carriage is seen in the direction of arrow A shown in FIG. 2.
Figure 4:
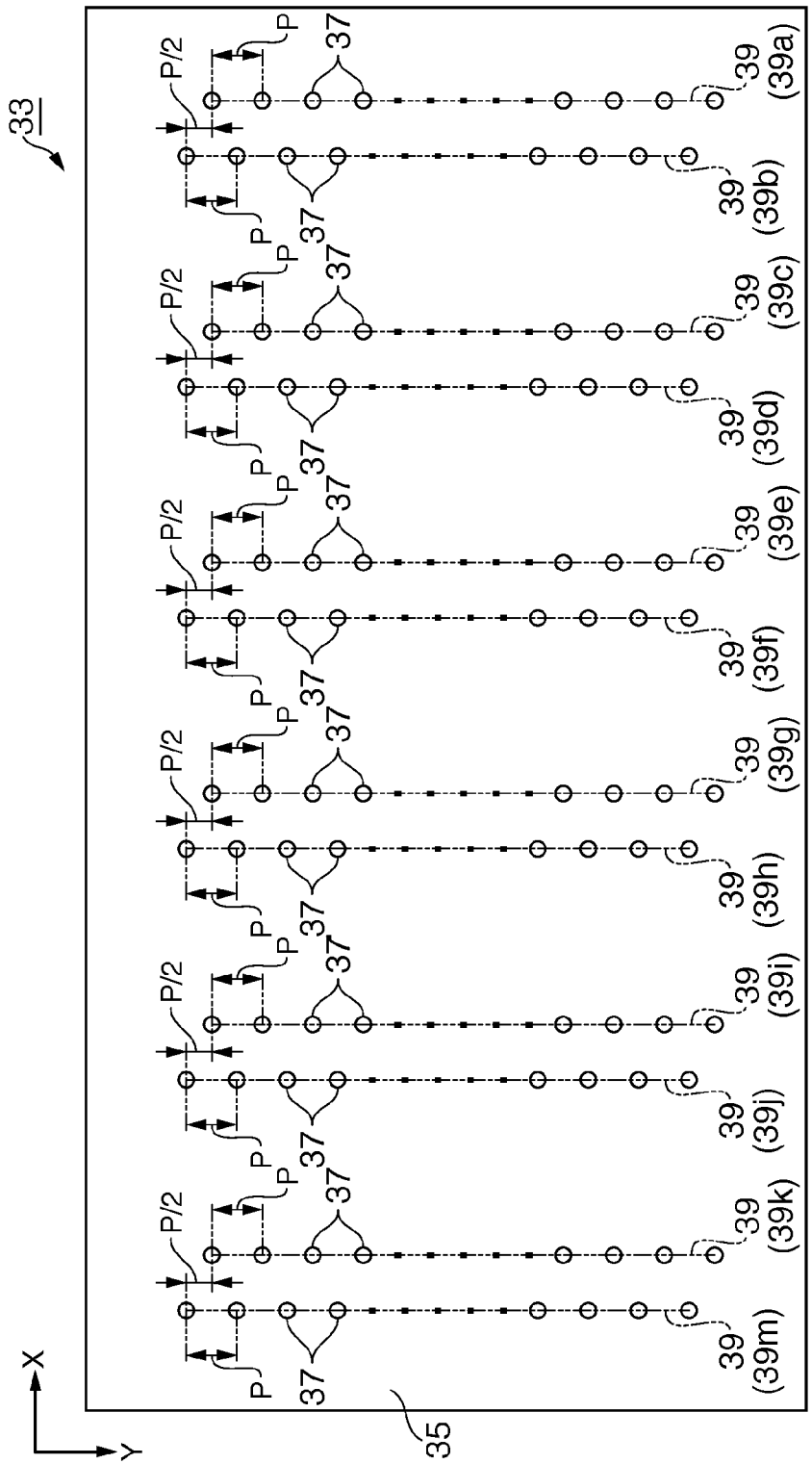
FIG. 4 is a bottom view of an ejection head according to this embodiment.

The head unit 14, as shown in FIG. 3 as a front view acquired when the carriage 12 is seen in the direction of arrow A shown in FIG. 2, includes a head plate 31 and an ejection head 33. The ejection head 33, as shown in FIG. 4 as a bottom view, includes a nozzle surface 35. On the nozzle surface 35, a plurality of nozzles 37 is formed. In FIG. 4, in order to represent the nozzles 37 to be easily understood, the nozzles 37 are exaggerated, and the number of the nozzles 37 is decreased. In the ejection head 33, the plurality of the nozzles 37 forms twelve nozzle rows 39 each arranged in the Y direction. The twelve nozzle rows 39 are parallel to each other in a state in which gaps therebetween are open in the X direction. In each nozzle row 39, the plurality of the nozzles 37 is formed with a predetermined nozzle gap P in the Y direction.

Hereinafter, when each of the twelve nozzle rows 39 is to be identified, notations of a nozzle row 39*a*, a nozzle row 39*b*, a nozzle row 39*c*, a nozzle row 39*d*, a nozzle row 39*e*, a nozzle row 39*f*, a nozzle row 39*g*, a nozzle row 39*h*, a nozzle row 39*i*, a nozzle row 39*j*, a nozzle row 39*k*, and a nozzle row 39*m* are used.

In the ejection head 33, the nozzle row 39*a* and nozzle row 39*b* are misaligned from each other by a distance P/2 in the Y direction. The nozzle row 39*c* and nozzle row 39*d* are misaligned from each other by a distance P/2 in the Y direction. Similarly, the nozzle row 39*e* and nozzle row 39*f* are misaligned from each other by a distance P/2 in the Y direction, and the nozzle row 39*g* and nozzle row 39*h* are misaligned from each other by a distance P/2 in the Y direction. Similarly, the nozzle row 39*i* and nozzle row 39*j* are misaligned from each other by a distance P/2 in the Y direction, and the nozzle row 39*k* and nozzle row 39*m* are misaligned from each other by a distance P/2 in the Y direction.

Figure 5:
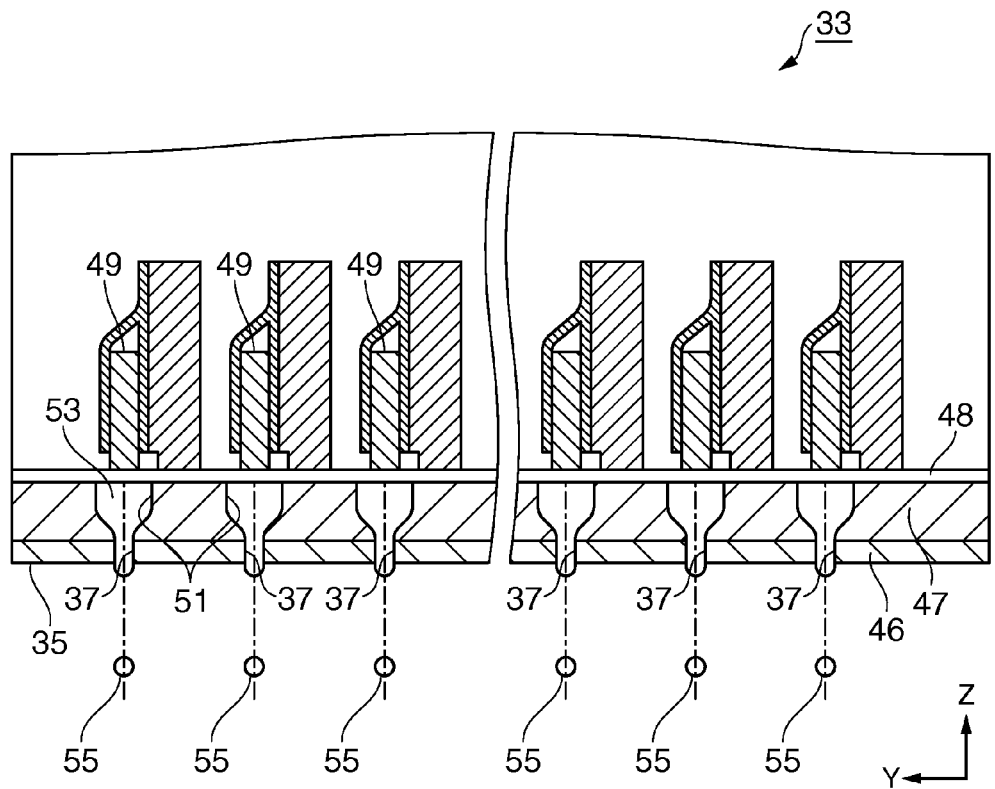
FIG. 5 is a cross-section view taken along line B-B shown in FIG. 3.

The ejection head 33 as shown in FIG. 5 as a cross-sectional view taken along line B-B shown in FIG. 3 includes a nozzle plate 46, a cavity plate 47, a vibration plate 48, and a plurality of piezoelectric elements 49.

The nozzle plate 46 includes the nozzle surface 35. The plurality of the nozzles 37 is disposed on the nozzle plate 46.

The cavity plate 47 is disposed on a face of the nozzle plate 46 that is located on the side opposite to the nozzle surface 35. In the cavity plate 47, a plurality of cavities 51 is formed. The cavities 51 are disposed in correspondence with the nozzles 37 and respectively communicate with the corresponding nozzles 37. A functional liquid 53 is supplied to each cavity 51 from a tank not shown in the figure.

The vibration plate 48 is disposed on a face of the cavity plate 47 that is located on a side opposite to the nozzle plate 46 side. The vibration plate 48 vibrates (vertically vibrates) in the Z direction, thereby increasing or decreasing the volume inside the cavity 51.

The plurality of piezoelectric elements 49 is disposed on a face of the vibration plate 48 that is located on a side opposite to the cavity plate 47 side. The piezoelectric elements 49 are disposed in correspondence with the cavities 51 and face the cavities 51 with the vibration plate 48 being interposed therebetween. Each piezoelectric element 49 expands based on a driving signal. Accordingly, the vibration plate 48 decreases the volume inside the cavity 51. At this time, pressure is applied to the functional liquid 53 inside the cavity 51. As a result, the functional liquid 53 is ejected as liquid droplets 55 from the nozzles 37. A method of ejecting the liquid droplets 55 using the ejection head 33 is one of the ink jet methods. The ink jet method is one of the coating methods.

The ejection head 33 having the above-described configuration, as shown in FIG. 3, is supported by the head plate 31 in the state in which the nozzle surface 35 protrudes from the head plate 31.

The carriage 12, as shown in FIG. 3, supports the head unit 14. Here, the head unit 14 is supported by the carriage 12 in the state in which the nozzle surface 35 faces the lower side in the Z direction.

In this embodiment, the vertical-vibration-type piezoelectric element 49 is used. However, a pressing unit that is used for applying pressure to the functional liquid is not limited thereto. For example, a bending-transformation-type piezoelectric element that is formed by laminating a lower electrode, a piezoelectric layer, and an upper electrode may be used. In addition, as the pressing unit, a so-called electrostatic-type actuator that ejects liquid droplets from nozzles by generating static electricity between a vibration plate and an electrode and transforming the vibration plate depending on an electrostatic force may be used. Furthermore, a configuration in which bubbles are generated inside nozzles using a heating body and pressure is applied to the functional liquid using the bubbles may be used.

In this embodiment, as the functional liquid 53, a liquid whose curing is precipitated by receiving activation energy is used. In addition, in this embodiment, light is used as the activation energy. In other words, in this embodiment, the functional liquid 53 has a photo-curable property in which curing of the functional liquid 53 is precipitated by receiving irradiation of light. In this embodiment, as light that is used for precipitating the curing of the functional liquid 53, an ultraviolet light is used.

As the functional liquid 53 whose curing is precipitated by receiving irradiation of light, a resin material to which a photo-curing agent is added or the like may be used. As the resin material, for example, an acryl-based or epoxy-based resin material or the like may be used. As the photo-curing agent, for example, a radical-polymerization-type photopolymerization initiator, a cation-polymerization-type photopolymerization initiator, or the like may be used.

Examples of the radical-polymerization-type photopolymerization initiator include isobutyl benzoin ether, isopropyl benzoin ether, benzoin ethyl ether, benzoin methyl ether, benzyl, hydroxy cyclohexyl phenyl ketone, diethoxy acetophenon, chlorothioxanthone, isopropyl thioxanthone, and the like.

In addition, examples of the cation-polymerization-type photopolymerization initiator include allyl sulfonium salt derivatives, allyl iodonium salt derivatives, diazonium salt derivatives, and triazine-based initiators.

By adding a functional material such as a coloring element including pigments, dyes, or the like, a lyophilic or liquid-repellent surface reforming material, or the like to the functional liquid 53 having the above-described configuration, the functional liquid 53 having a unique function can be generated.

The functional liquid 53 containing a coloring element such as a pigment or a dye can represent a cross-section pattern, which is drawn on the substrate W, in colors. Hereinafter, a functional liquid 53 that contains a coloring element such as pigment, dye, or the like is referred to as a color coating material.

In addition, for example, by using a resin material having optical transparency as the resin material as a component of the functional liquid 53, a functional liquid 53 having optical transparency can be formed. Hereinafter, the functional liquid 53 having optical transparency is referred to as a translucent coating material. The functional liquid 53 having the optical transparency, for example, may be used as clear ink.

As the application of clear ink, for example, an application as an overcoat layer with which an image is coated or an application as a base layer before formation of an image, or the like may be considered. Hereinafter, the functional liquid 53 that is applied as the base layer is referred to as a base coating material.

As the base coating material, not only a translucent coating material but a functional liquid 53 acquired by adding various pigments to a translucent coating material may be used.

In this embodiment, as the functional liquid 53, five types of the color coating materials having different colors and one type of the translucent coating material are used. The different colors of the five-types of the color coating materials are yellow (Y), magenta (M), cyan (C), black (K), and white (W).

Hereinafter, when the five types of the functional liquid 53 are individually identified by their colors, notations of a functional liquid 53Y, a functional liquid 53M, a functional liquid 53C, a functional liquid 53K, and a functional liquid 53W are used. In addition, for a functional liquid 53 corresponding to a translucent coating material, a notation of a functional liquid 53T is used. In this embodiment, since the color coating materials (the functional liquids 53) having five different colors are used, color representation of a three-dimensional object 7 is realized. In addition, since the translucent coating material is used in this embodiment, a three-dimensional object 7 having light transparency can be molded.

In the ejection head 33, twelve nozzle rows 39 (FIG. 4) described above are divided by the colors of the functional liquids 53. In this embodiment, the nozzles 37 belonging to the nozzle row 39a and the nozzle row 39b eject the functional liquids 53K as the liquid droplets 55. The nozzles 37 belonging to the nozzle row 39c and the nozzle row 39d eject the functional liquids 53C as the liquid droplets 55. In addition, the nozzles 37 belonging to the nozzle row 39e and the nozzle row 39f eject the functional liquids 53M as the liquid droplets 55. The nozzles 37 belonging to the nozzle row 39g and the nozzle row 39h eject the functional liquids 53Y as the liquid droplets 55. The nozzles 37 belonging to the nozzle row 39i and the nozzle row 39j eject the functional liquids 53W as the liquid droplets 55. The nozzles 37 belonging to the nozzle row 39k and the nozzle row 39m eject the functional liquids 53T as the liquid droplets 55.

The carriage transporting device 13, as shown in FIG. 2, includes amount 61, a guide rail 63, and a carriage position detecting device 65.

The mount 61 extends in the X direction and passes over the substrate transporting device 11 in the X direction. The mount 61 faces the substrate transporting device 11 on a side opposite to the surface plate 21 side of the table 25. The mount 61 is supported by a support post 67a and a support post 67b. The support post 67a and the support post 67b are disposed at opposite positions with the surface plate 21 interposed therebetween in the X direction. The support post 67a and the support post 67b protrude to the upper side in the Z direction relative to the table 25. Accordingly, a gap is maintained between the mount 61 and the table 25.

The guide rail 63 is disposed on the surface plate 21 side of the mount 61. The guide rail 63 extends in the X direction and is disposed over the width of the mount 61 in the X direction. The above-described carriage 12 is supported by the guide rail 63. In the state in which the carriage 12 is supported by the guide rail 63, the nozzle surface 35 of the ejection head 33 faces the table 25 side in the Z direction. The carriage 12 is guided by the guide rail 63 in the X direction and is supported by the guide rail 63 in a state of being reciprocable in the X direction. In the plan view, in the state in which the carriage 12 and the table 25 overlap each other, the nozzle surface 35 and the mounting surface 25a of the table 25 face each other with a gap therebetween being maintained. The carriage position detecting device 65 is disposed between the mount 61 and the carriage 12 and extends in the X direction. The carriage position detecting device 65 detects the position of the carriage 12 in the X direction.

The carriage 12 is configured so as to reciprocate in the X direction by a movement mechanism and a power source that are not shown in the figure. As the movement mechanism, a mechanism acquired by combining a ball screw and a ball nut, a linear guide mechanism, or the like can be used. In this embodiment, as the power source used for moving the carriage 12 in the X direction, a carriage transporting motor to be described later is used. As the carriage transporting motor, various motors such as a stepping motor, a servo motor, and a linear motor can be used.

The power is transferred from the carriage transporting motor to the carriage 12 through the movement mechanism. Accordingly, the carriage 12 can reciprocate along the guide rail 63, that is, the X direction. In other words, the carriage transporting device 13 can reciprocate the head unit 14, which is supported by the carriage 12, in the X direction.

The exposure device 15 is a device that irradiates ultraviolet light onto a cross-section pattern drawn on the substrate W. The exposure device 15 is disposed one end side of the surface plate 21 in the Y direction. The height of the exposure device 15 in the Z direction is suppressed as being equal to or less than the height of the top face 21a of the surface plate 21.

The guide rail 23a and the guide rail 23b extend over the length of the exposure device 15 in the Y direction. The guide rail 23a and the guide rail 23b face each other in the X direction with the exposure device 15 interposed therebetween.

Figure 6:
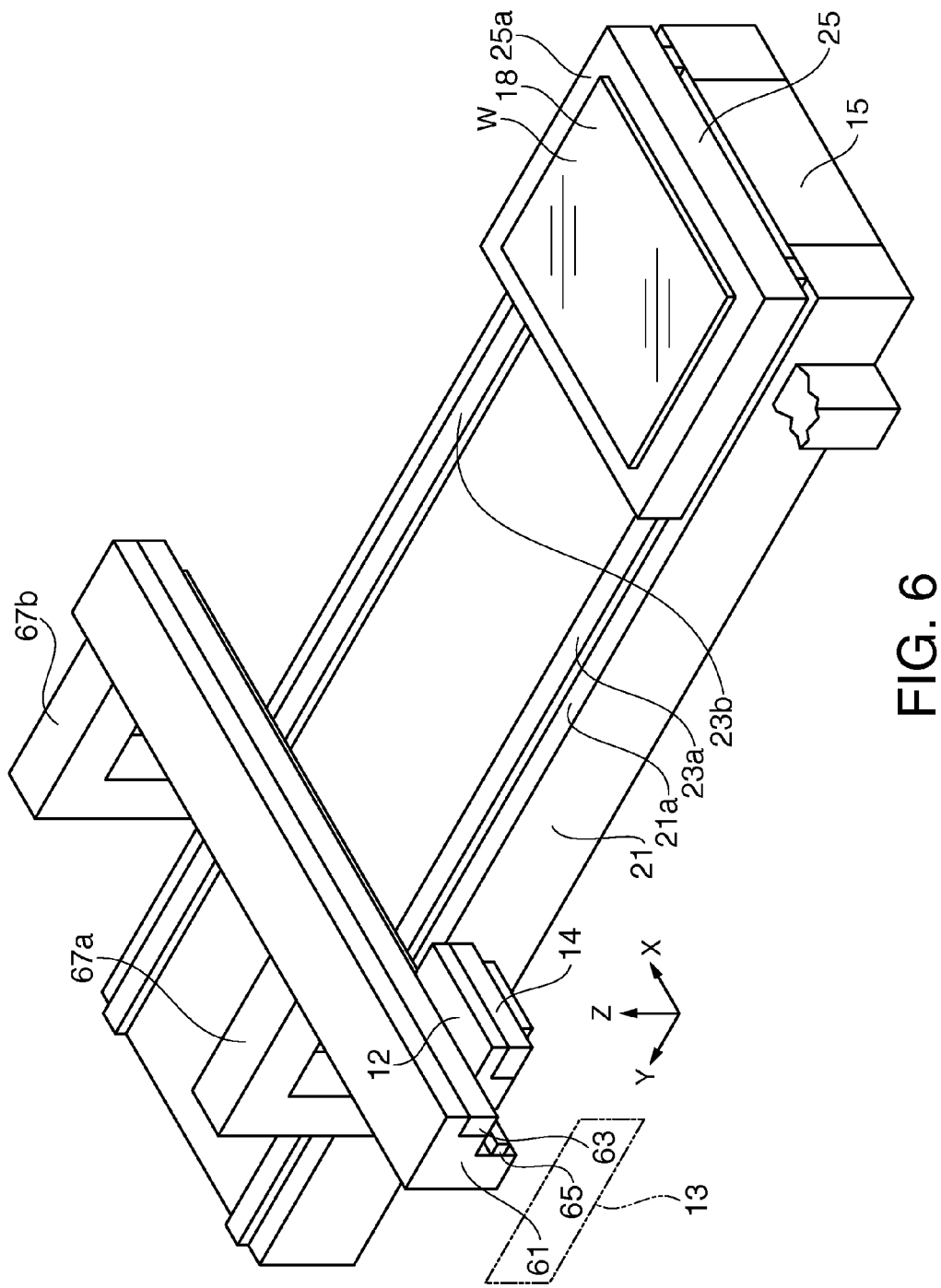
FIG. 6 is a perspective view showing the state in which a substrate table and an exposure device overlap each other in a molding apparatus according to this embodiment.

Accordingly, the table 25, as shown in FIG. 6, overlaps the exposure device 15 in the plan view.

Figure 7:
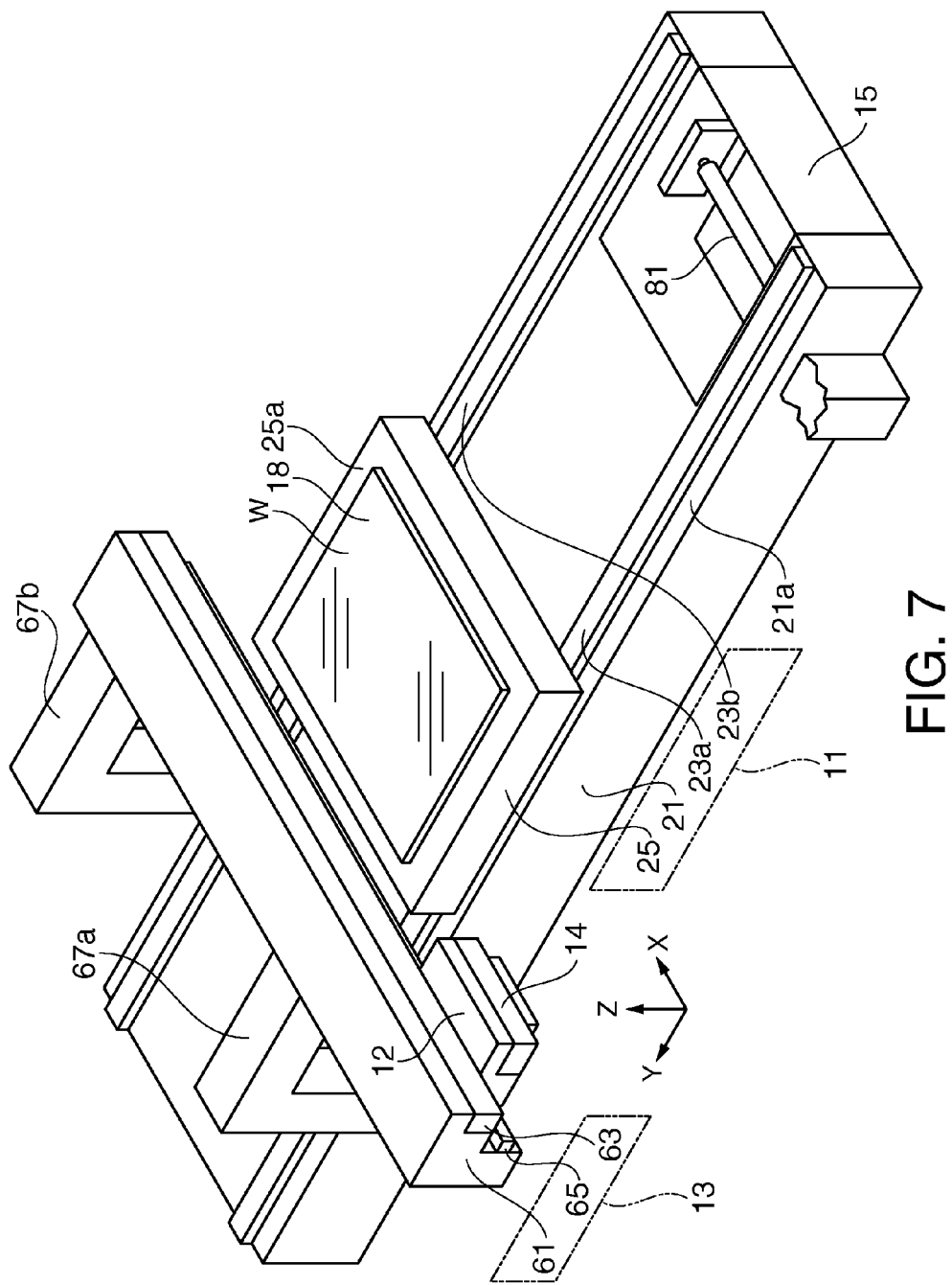
FIG. 7 is a perspective view showing a light source of an exposure device according to this embodiment.

The exposure device 15, as shown in FIG. 7, includes a light source 81. The light source 81 emits ultraviolet light. As the light source 81, for example, a mercury lamp, a metal halide lamp, a xenon lamp, an excimer lamp, or the like can be used.

In this embodiment, the table 25 has optical transparency for the ultraviolet light. Accordingly, in the state in which the table 25 and the exposure device 15 overlap each other in the plan view, the ultraviolet light emitted from the exposure device 15 can reach the substrate W that is mounted on the table 25. Examples of the material of the table 25 include glass, quartz, and the like.

The transfer device 17, as shown in FIG. 2, includes a support post 83, a transfer plate 85, and an elevation motor 87.

The support post 83 is disposed in a position overlapping the exposure device 15 in the plan view. The support post 83 passes over the surface plate 21 and the exposure device 15 in the X direction. In the state in which the table 25 and the exposure device 15 overlap each other in the plan view, a gap is maintained between the table 25 and the support post 83.

The transfer plate 85 is disposed in a position overlapping the exposure device 15 in the plan view. The transfer plate 85 hangs at a beam portion 83a of the support post 83 toward the lower side in the Z direction. The transfer plate 85 is configured so as to be raised or lowered in the Z direction by an elevation mechanism not shown in the figure. As the elevation mechanism, for example, a mechanism acquired by combining a ball screw and a ball nut, a linear guide mechanism, or the like can be used.

The elevation motor 87 generates power used for raising or lowering the transfer plate 85 in the Z direction. The power is transferred from the elevation motor 87 to the transfer plate 85 through an elevation mechanism. Accordingly, the transfer plate 85 can be raised or lowered in the Z direction.

In addition, the transfer device 17 includes a transfer plate position detecting device to be described later. The transfer plate position detecting device detects the position of the transfer plate 85 in the Z direction. The position of the transfer plate 85 in the Z direction can be acquired based on a result of a detection operation of the transfer plate position detecting device.

Figure 8:
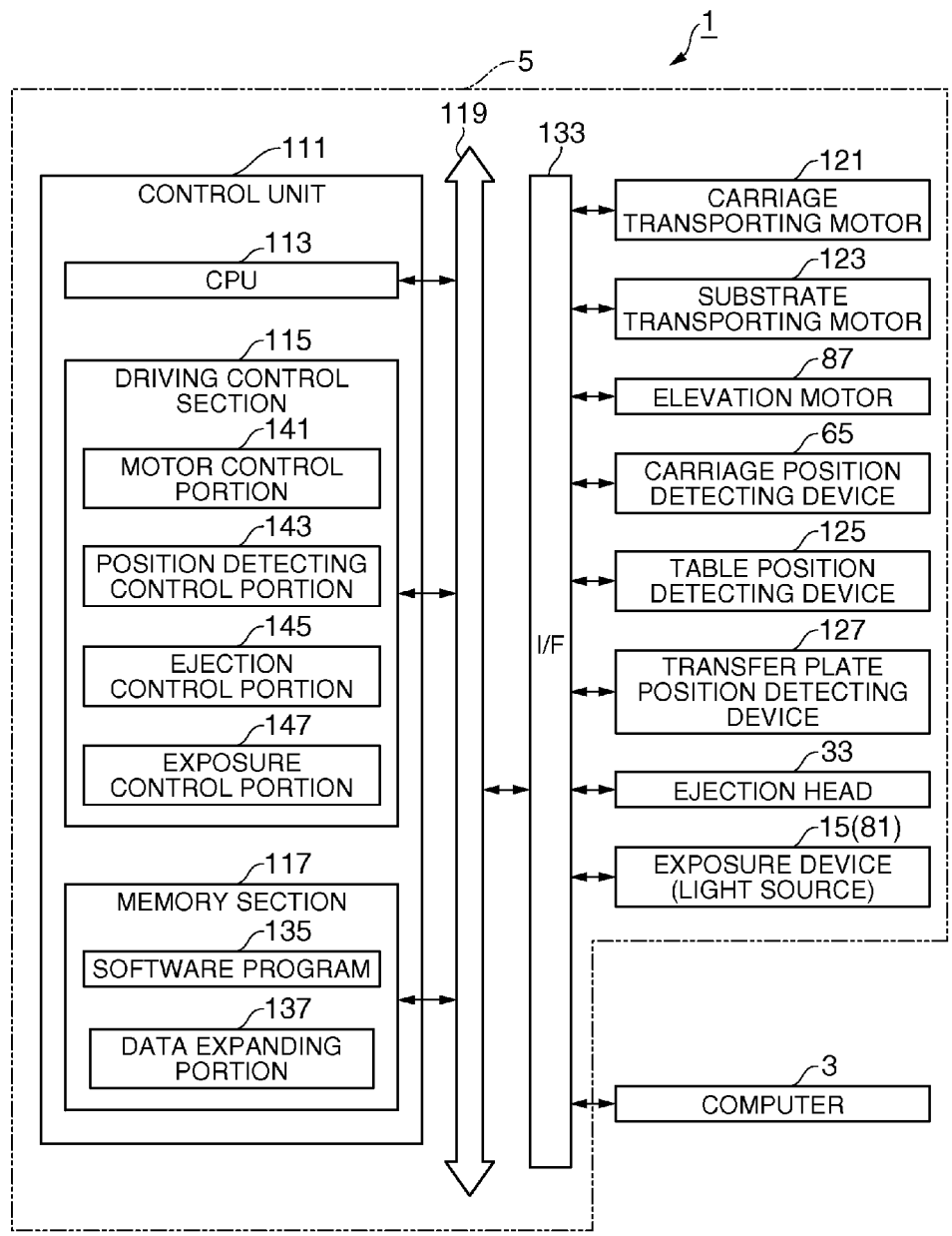
FIG. 8 is a block diagram showing the schematic diagram of a molding system according to this embodiment.

The molding apparatus 5, as shown in FIG. 8, includes a control unit 111 that controls the operation of each configuration described above. The control unit 111 includes a CPU (Central Processing Unit) 113, a driving control section 115, and a memory section 117. The driving control section 115 and the memory section 117 are connected to the CPU 113 through a bus 119.

In addition, the molding apparatus 5 includes a carriage transporting motor 121, a substrate transporting motor 123, a table position detecting device 125, and a transfer plate position detecting device 127. The carriage transporting motor 121, the substrate transporting motor 123, and the elevation motor 87 are connected to the control unit 111 through an input/output interface 133 and the bus 119. In addition, the carriage position detecting device 65, the table position detecting device 125, and the transfer plate position detecting device 127 are connected to the control unit 111 through the input/output interface 133 and the bus 119.

The carriage transporting motor 121 generates power that is used for driving the carriage 12. The substrate transporting motor 123 generates power that is used for driving the table 25. The table position detecting device 125 detects the position of the table 25 in the Y direction. The transfer plate position detecting device 127 detects the position of the transfer plate 85 in the Z direction.

In addition, the ejection head 33 and exposure device are connected to the control unit 111 through the input/output interface 133 and the bus 119. Furthermore, the computer 3 is connected to the control unit 111 through the input/output interface 133 and the bus 119.

The CPU 113 performs various calculation processes as a processor. The driving control section 115 controls to drive each configuration. The memory section 117 includes a RAM (Random Access Memory), a ROM (Read-Only Memory), and the like. In the memory section 117, an area in which a software program 135 describing the control sequence of the operation of the molding apparatus 5 is stored, a data expanding portion 137 as an area in which various types of data are temporarily expanded, and the like are set. As the data expanded in the data expanding portion 137, for example, there are cross-section data in which a cross-section pattern to be drawn is represented, program data used for a drawing process or the like, and the like.

The driving control section 115 includes a motor control portion 141, a position detecting control portion 143, an ejection control portion 145, and an exposure control portion 147.

The motor control portion 141 respectively controls to drive the carriage transporting motor 121, the substrate transporting motor 123, and the elevation motor 87 based on a command transmitted from the CPU 113.

The position detecting control portion 143 respectively controls the carriage position detecting device 65, the table position detecting device 125, and the transfer plate position detecting device 127 based on a command transmitted from the CPU 113.

The position detecting control portion 143 allows the carriage position detecting device 65 to detect the position of the carriage 12 in the X direction and outputs a result of the detection to the CPU 113 based on a command transmitted from the CPU 113.

In addition, the position detecting control portion 143 allows the table position detecting device 125 to detect the position of the table 25 in the Y direction and outputs a result of the detection to the CPU 113 based on a command transmitted from the CPU 113.

The position detecting control portion 143 allows the transfer plate position detecting device 127 to detect the position of the transfer plate 85 in the Z direction and outputs a result of the detection to the CPU 113 based on a command transmitted from the CPU 113.

The ejection control portion 145 controls to drive the ejection head 33 based on a command transmitted from the CPU 113.

The exposure control portion 147 individually controls the emission states of the light sources 81 of the exposure device 15 based on a command transmitted from the CPU 113.

Figure 9:
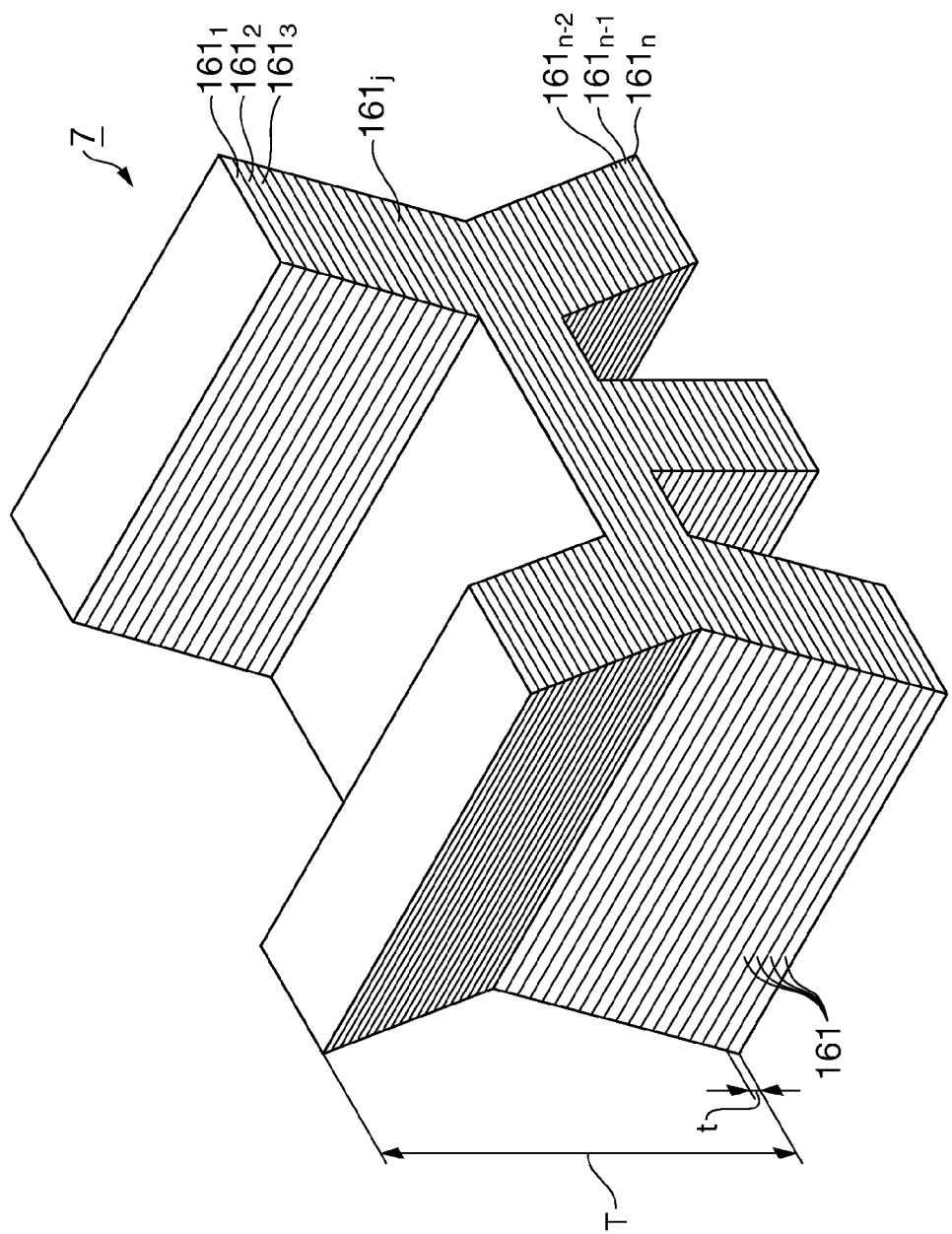
FIG. 9 is a diagram illustrating a plurality of cross-section elements according to this embodiment.

In the molding system 1 having the above-described configuration, a plurality of cross-section elements is extracted by the computer 3 from the shape data of the three-dimensional object 7 as a molding target. The three-dimensional object 7, as shown in FIG. 9, is configured by the plurality of cross-section elements 161. By sequentially overlapping the plurality of cross-section elements 161, the three-dimensional object 7 as the molding target is configured. In other words, the plurality of cross-sectional elements 161 is elements that configure the shape of the three-dimensional object 7 as the molding target.

The computer 3 generates a plurality of sets of cross-section data based on the plurality of the extracted cross-section elements 161. At this time, one set of the cross-section data is generated from one cross-section element 161. The plurality of sets of cross-section data is output to the molding apparatus 5.

Here, the flow according to a molding method of this embodiment will be described.

Figure 10:
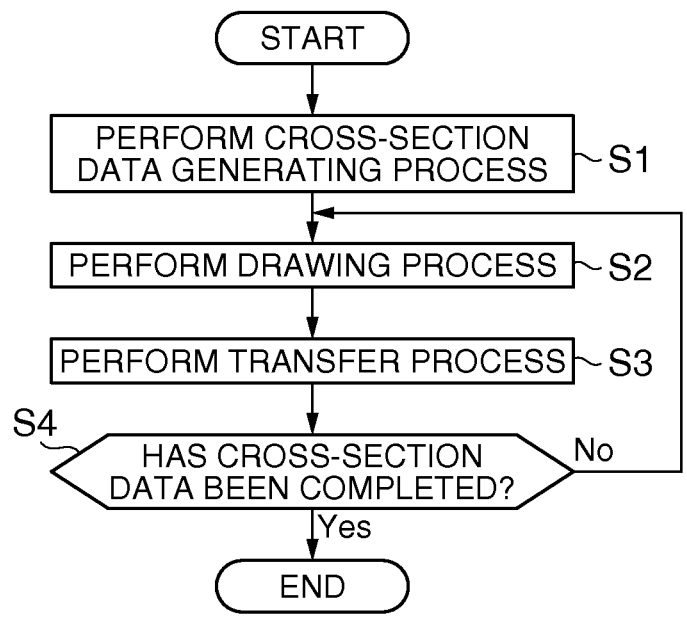
FIG. 10 is a diagram showing the flow of a molding method according to this embodiment.

The molding method of this embodiment, as shown in FIG. 10, includes a cross-section data generating process S1, a drawing process S2, and a transfer process S3.

In the cross-section data generating process S1, as described above, a plurality of sets of cross-section data is generated from the shape data of the three-dimensional object 7 as a molding target. In the cross-section data generating process S1, the cross-section data is generated by the computer 3.

In the drawing process S2, a cross-section pattern is drawn with the functional liquid 53 on a drawing surface 18 of the substrate W based on the cross-section data. In the drawing process S2, the cross-section pattern is drawn by the molding apparatus 5. The drawing surface 18, as shown in FIG. 2, is a surface located on a side opposite to the table 25 side and is a surface that faces the head unit 14 side. The drawing surface 18 is a surface on which the cross-section pattern is drawn with the functional liquid 53.

In the transfer process S3 after the drawing process S2, the cross-section pattern is transferred from the drawing surface 18 of the substrate W onto the transfer plate 85 while exposing the cross-section pattern by using the exposure device 15 for each drawn cross-section pattern.

The drawing process S2 and the transfer process S3 are repeatedly performed until there is no remaining cross-section data of a new cross-section pattern to be drawn. Accordingly, a three-dimensional object 7 is formed on the transfer plate 85.

Figure 11:
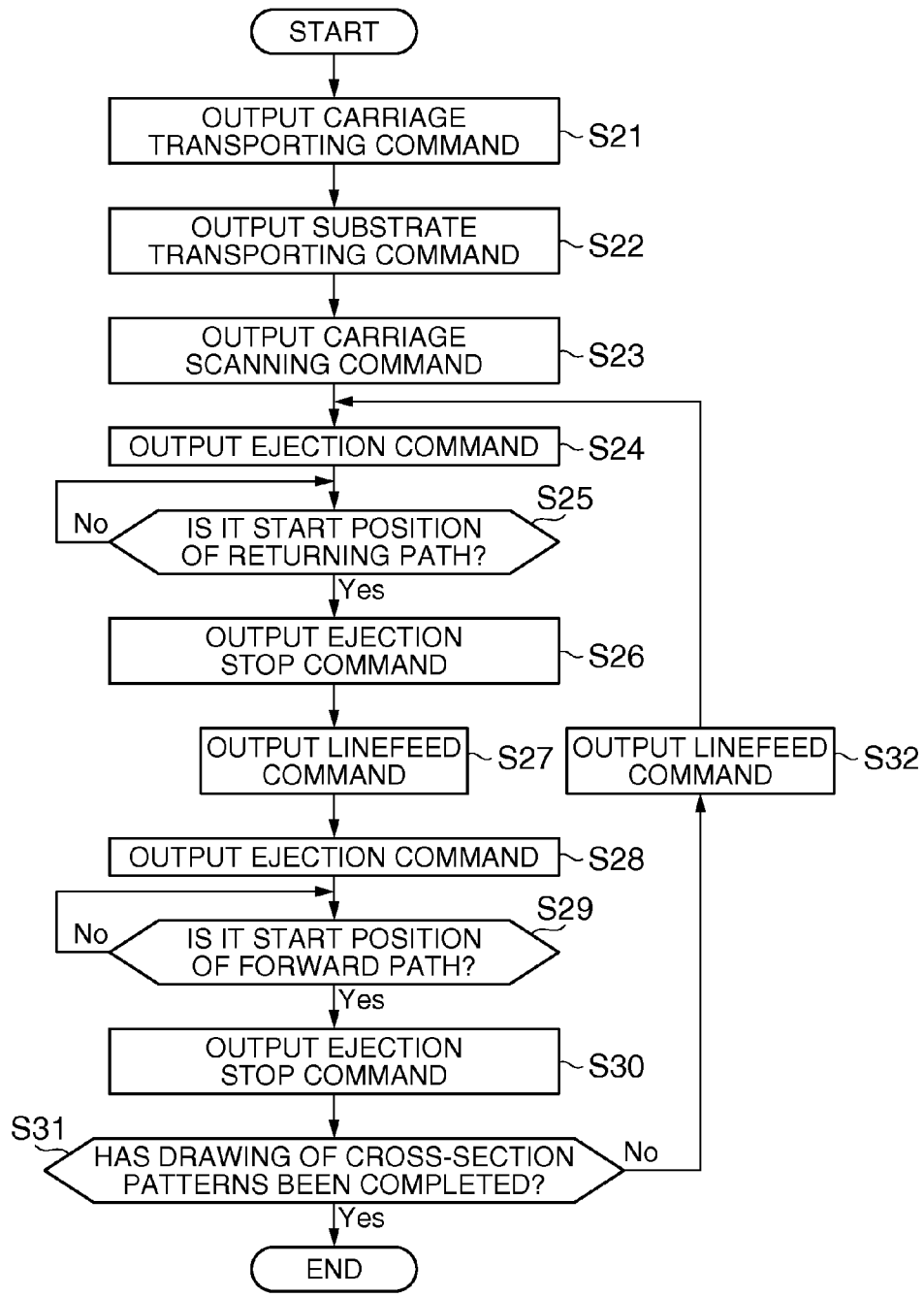
FIG. 11 is a diagram showing the flow of a drawing process according to this embodiment.

In the drawing process S2, when the control unit 111 (FIG. 8) of the molding apparatus 5 acquires the cross-section data from the computer 3 through the input/output interface 133 and the bus 119, a drawing process represented in FIG. 11 is performed for each cross-section data by the CPU 113.

Here, in the cross-section data, a cross-section pattern to be drawn is represented in a bit map pattern. The drawing of the cross-section pattern on the substrate W is performed by ejecting the liquid droplets 55 from the ejection head 33 with a predetermined period while relatively reciprocating the ejection head 33 and the substrate W in the state in which the ejection head 33 faces the substrate W.

In the drawing process, the CPU 113, first, outputs a carriage transport command to the motor control portion 141 (FIG. 8) in Step S21. At this time, the motor control portion 141 moves the carriage 12 to a start position of the forward path in a drawing area by controlling to drive the carriage transporting motor 121. Here, the drawing area is an area in which a trajectory drawn by the table 25 shown in FIG. 2 in the Y direction and a trajectory drawn by the ejection head 33 in the X direction overlap each other. The start position of the forward path is a position at which the forward path used for reciprocating the carriage 12 starts. In this embodiment, the start position of the forward path is located on the support post 67a side of the surface plate 21 in the X direction. The start position of the forward path is located on the outer side of the surface plate 21 in the plan view. Next, in Step S22, the CPU 113 outputs a substrate transport command to the motor control portion 141 (FIG. 8). At this time, the motor control portion 141 moves the substrate W to the drawing area by controlling to drive the substrate transporting motor 123.

Next, the CPU 113 outputs a carriage scanning command to the motor control portion 141 (FIG. 8) in Step S23. At this time, the motor control portion 141 starts to reciprocate the carriage 12 by controlling to drive the carriage transporting motor 121.

Here, in the reciprocation of the carriage 12, the carriage 12 reciprocates between the above-described start position of the forward path and a start position of a return path. In other words, a path formed by starting from the start position of the forward path, turning over at the start position of the return path, and returning to the start position of the forward path forms one operation of the reciprocation of the carriage 12. Accordingly, in this embodiment, a path toward the start position of the return path from the start position of the forward path is the forward path of the carriage 12. On the other hand, a path toward the start position of the forward path from the start position of the return path is the return path of the carriage 12.

In addition, the start position of the return path is a position that is opposite to the start position of the forward path in the X direction with respect to the surface plate 21 (FIG. 2). The start position of the return path is located on the outer side of the surface plate 21 in the plan view. Accordingly, the start position of the forward path and the start position of the return path face each other with the surface plate 21 being interposed therebetween in the X direction.

Next, the CPU 113 outputs an ejection command to the ejection control portion 145 (FIG. 8) in Step S24. At this time, the ejection control portion 145 ejects liquid droplets 55 from the nozzles 37 based on the cross-section data by controlling to drive the ejection head 33. Accordingly, drawing is performed in the forward path.

Next, the CPU 113 determines whether the position of the carriage 12 arrives at the start position of the return path in Step S25. At this time, when the position of the carriage 12 is determined to have arrived at the start position of the return path (Yes), the process proceeds to Step S26. On the other hand, when the position of the carriage 12 is determined not to have arrived at the start position of the return path (No), the process is waited for until the position of the carriage 12 arrives at the start position of the return path.

In Step S26, the CPU 113 outputs an ejection stop command to the ejection control portion 145 (FIG. 8). At this time, the ejection control portion 145 stops the ejection of liquid droplets 55 from the nozzles 37 by stopping the driving of the ejection head 33. Accordingly, the drawing in the forward path is completed. Next, the CPU 113 outputs a linefeed command to the motor control portion 141 (FIG. 8) in Step S27. At this time, the motor control portion 141 moves a new area in which a pattern is to be drawn for the substrate W to the drawing area by moving (line feeding) the substrate W in the Y direction by controlling to drive the substrate transporting motor 123.

Next, the CPU 113 outputs an ejection command to the ejection control portion 145 (FIG. 8) in Step S28. At this time, the ejection control portion 145 ejects liquid droplets 55 from the nozzles 37 based on drawing data by controlling to drive the ejection head 33. Accordingly, the drawing in the return path is performed.

Next, the CPU 113 determines whether the position of the carriage 12 arrives at the start position of the forward path in Step S29. At this time, when the position of the carriage 12 is determined to have arrived at the start position of the forward path (Yes), the process proceeds to Step S30. On the other hand, when the position of the carriage 12 is determined not to have arrived at the start position of the forward path (No), the process is waited for until the position of the carriage 12 arrives at the start position of the forward path.

In Step S30, the CPU 113 outputs an ejection stop command to the ejection control portion 145 (FIG. 8). At this time, the ejection control portion 145 stops the ejection of liquid droplets 55 from the nozzles 37 by stopping the driving of the ejection head 33. Accordingly, drawing in the return path is completed.

Next, in Step S31, the CPU 113 determines whether drawing of the cross-section pattern based on the cross-section data has completed. At this time, when the drawing of the cross-section pattern is determined to have completed (Yes), the process is completed. On the other hand, when the drawing of the cross-section pattern is determined not to have completed (No), the process proceeds to Step S32.

In Step S32, the CPU 113 outputs a linefeed command to the motor control portion 141 (FIG. 8) and then transfers the process to Step S24. At this time, in Step S32, the motor control portion 141 moves a new area in which a pattern is to be drawn for the substrate W to the drawing area by moving (line feeding) the substrate W in the Y direction by controlling to drive the substrate transporting motor 123.

Figure 12:
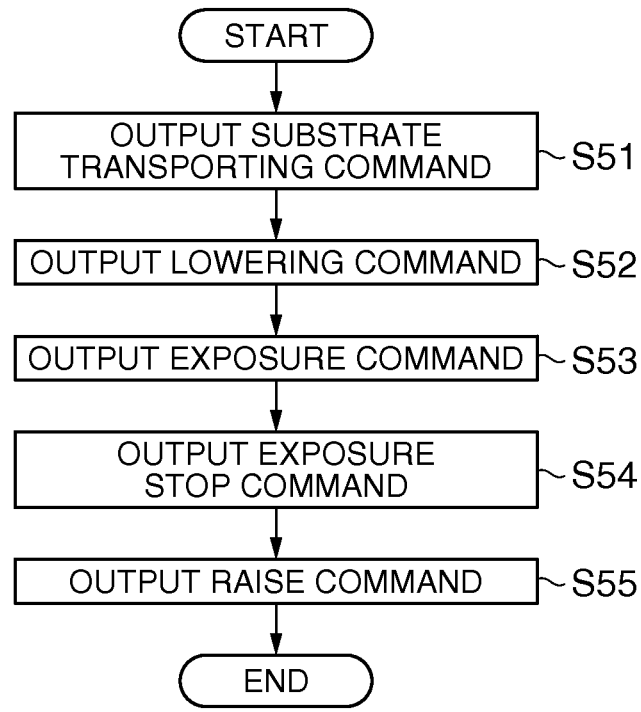
FIG. 12 is a diagram showing the flow of a transfer process according to this embodiment.

In the transfer process S3, when the drawing process on the basis of the cross-section data is completed, a transfer process shown in FIG. 12 is started by the CPU 113. The transfer process is performed each time when the drawing process on the basis of the cross-section data is performed.

In the transfer process, the CPU 113, first, outputs a substrate transporting command to the motor control portion 141 (FIG. 8) in Step S51. At this time, the motor control portion 141 moves the substrate W to an exposure area by controlling to drive the substrate transporting motor 123. Here, the exposure area is an area overlapping the exposure device 15 in the plan view.

Next, in Step S52, the CPU 113 outputs a lowering command to the motor control portion 141 (FIG. 8). At this time, the motor control portion 141 lowers the transfer plate 85 by controlling to drive the elevation motor 87.

Here, a case will be assumed in which n (here n is an integer equal to or greater than two) cross-section elements 161 are extracted in the cross-section data generating process 51 (FIG. 10). Hereinafter, when the n cross-section elements 161 are to be individually identified, as shown in FIG. 9, each of the n cross-section elements 161 is noted as a cross-section element 161$_j$ (here, j is an integer in the range of 1 to n). Each of the n cross-section elements 161 has a thickness t. By sequentially overlapping the first to n-th cross-section elements 161 corresponding to the n cross-section elements 161$_j$, a three-dimensional object 7 having a thickness T as a molding target is configured. In other words, there is the relationship of "T=n×t" between the thickness T and the thickness t.

Figure 13:
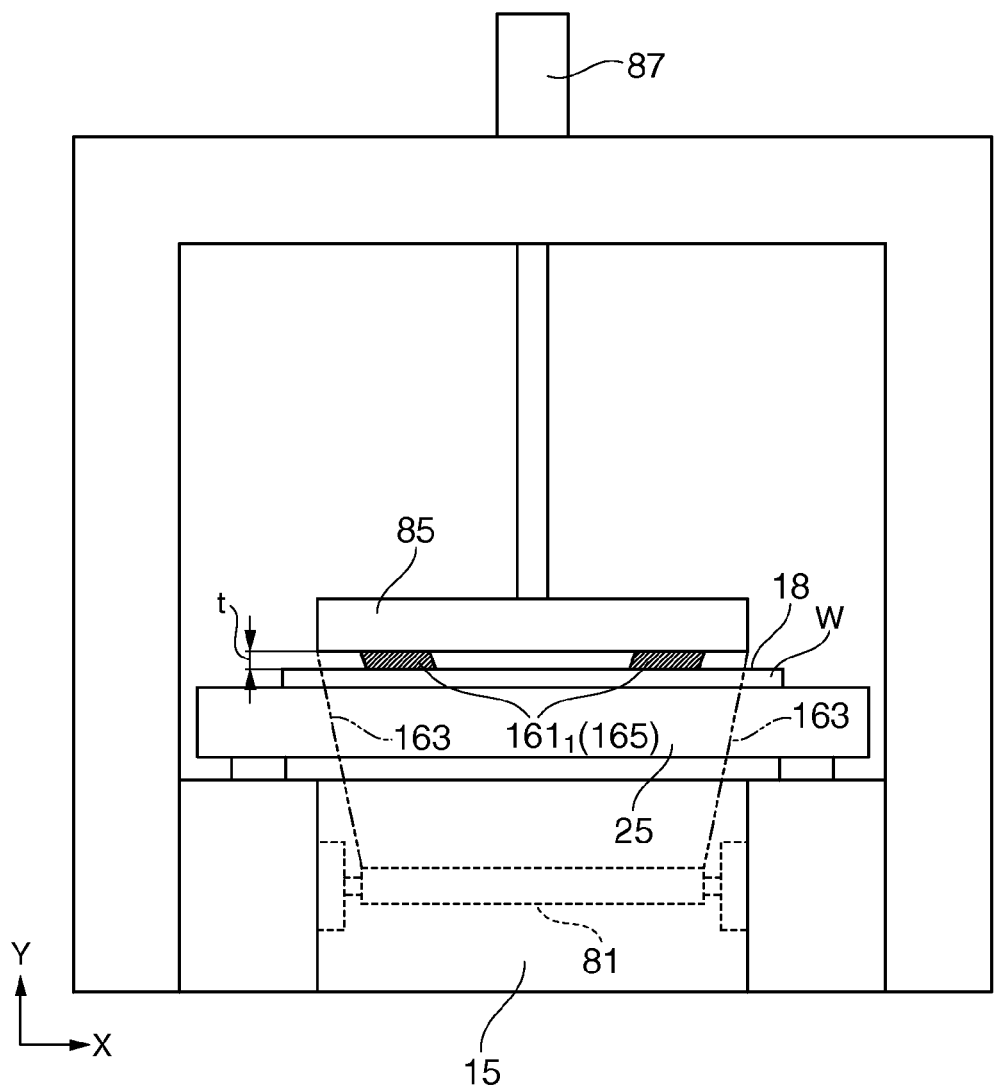
FIG. 13 is a diagram illustrating a gap between a substrate and a transfer plate in a transfer process according to this embodiment.

In Step S52, the lowered position of the transfer plate 85 is controlled in accordance with numbers j from 1 to n of the n cross-section elements 161. For example, for the first cross-section element 161, a gap between the substrate W and the transfer plate 85, as shown in FIG. 13, is controlled to be a distance t. In other words, in Step S52, a gap between the substrate W and the transfer plate 85 is controlled to be a distance of "j×t" in accordance with the number j.

In Step S53 after Step S52, the CPU 113 outputs an exposure command to the exposure control portion 147 (FIG. 8). At this time, the exposure control portion 147 turns on the light source 81 of the exposure device 15 by controlling to drive the light source 81 of the exposure device 15.

Here, in this embodiment, the substrate W has optical transparency for ultraviolet light. Accordingly, the ultraviolet light 163 emitted from the exposure device 15, as shown in FIG. 13, can arrive at the cross-section pattern 165 corresponding to the cross-section element 161 through the table 25 and the substrate W. As the material of the substrate W, for example, glass, quartz, or the like can be used. In addition, as the ultraviolet light 163, ultraviolet light having a wavelength equal to or longer than 200 nm can be used.

In FIG. 13, in order to represent the configuration to be more easily understood, hatching is added to the cross-section element 161 (the cross-section pattern 165).

In Step S54 after Step S53, the CPU 113 outputs an exposure stop command to the exposure control portion 147 (FIG. 8). At this time, the exposure control portion 147 turns off the light source 81 of the exposure device 15 by controlling to drive the light source 81 of the exposure device 15.

Figure 14:
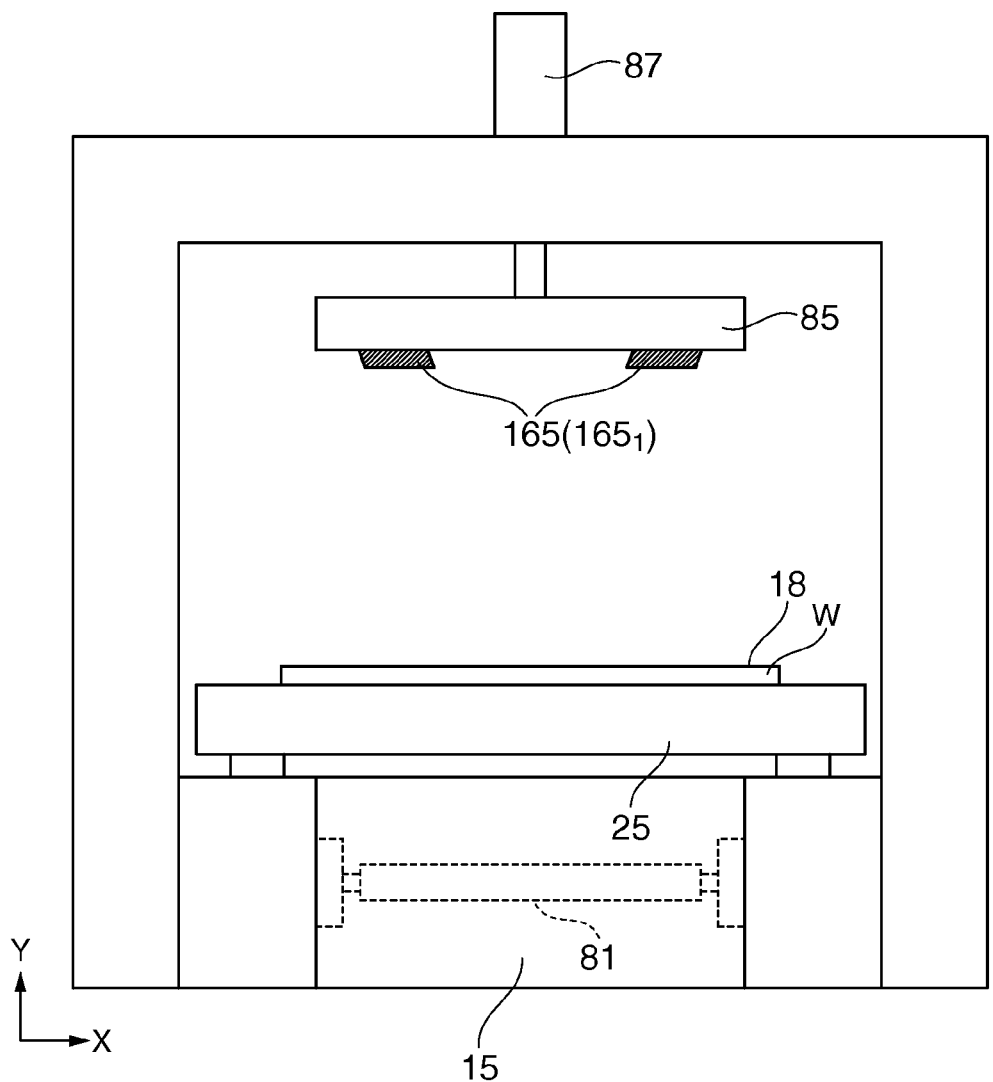
FIG. 14 is a diagram illustrating a cross-section pattern transferred to a transfer plate in a transfer process according to this embodiment.

Next, in Step S55, the CPU 113 outputs a raise command to the motor control portion 141 (FIG. 8) and then completes the process. At this time, in Step S55, the motor control portion 141 raises the transfer plate 85 by controlling to drive the elevation motor 87. Accordingly, the cross-section pattern 165 for which exposure has been performed, as shown in FIG. 14, is transferred to the transfer plate 85. Hereinafter, when the cross-section pattern 165 is to be individually identified in correspondence with a cross-section element 161, a notation of cross-section pattern 165$_j$ is used.

Figure 15:
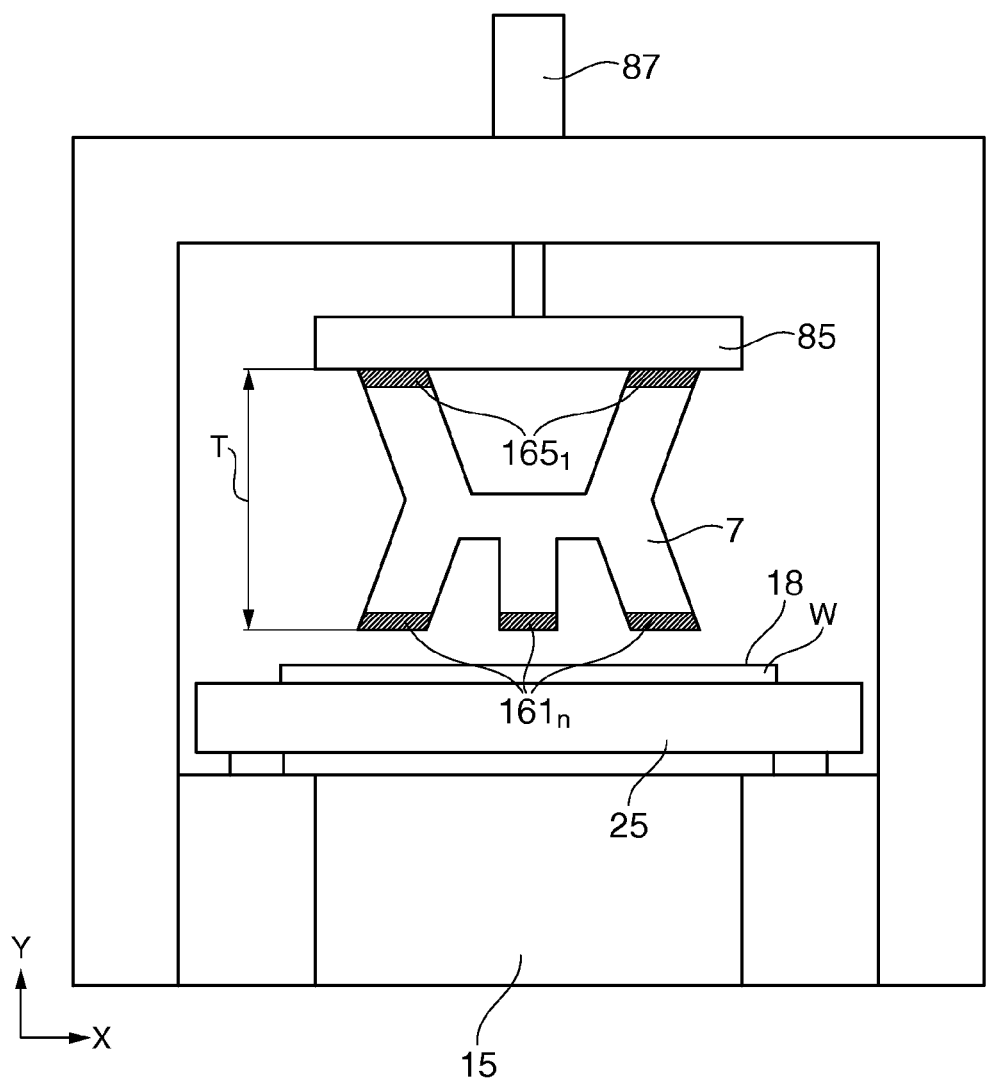
FIG. 15 is a diagram illustrating a three-dimensional object that is molded by a molding apparatus according to this embodiment.

By repeatedly performing the drawing process and the transfer process described above up to the n-th cross-section element 161$_n$, n cross-section patterns 165 including a cross-section pattern 165$_n$ to a cross-section pattern 165$_n$, as shown in FIG. 15, sequentially overlap one another on the transfer plate 85. Accordingly, the three-dimensional object 7 is formed.

In this embodiment, a liquid repellent area that is an area representing a liquid repellency for the functional liquid 53 is disposed on the drawing surface 18 of the substrate W. Accordingly, in the transfer process S3, the cross-section pattern 165 can be easily detached from the substrate W.

The liquid repellency for the functional liquid 53 can be provided by coating the drawing surface 18 with a material that represents a liquid repellency for the functional liquid 53. Examples of the material representing the liquid repellency for the functional liquid 53 include materials containing fluorine or a fluorine compound. As a coating method, various methods such as a gas phase method in which the drawing surface is exposed in a gas, a dip method in which the drawing surface is dipped into a liquid, a spray method in which a liquid is sprayed, a spin coat method in which a liquid extends, and the like can be used.

In this embodiment, the drawing surface 18 is coated with a material that contains a fluoroalkylsilane compound as one of the fluorine compounds.

The liquid repellency for the functional liquid 53 can be provided also by performing a plasma process, for example, using a gas containing fluorine or a fluorine compound for the substrate W.

Figure 16:
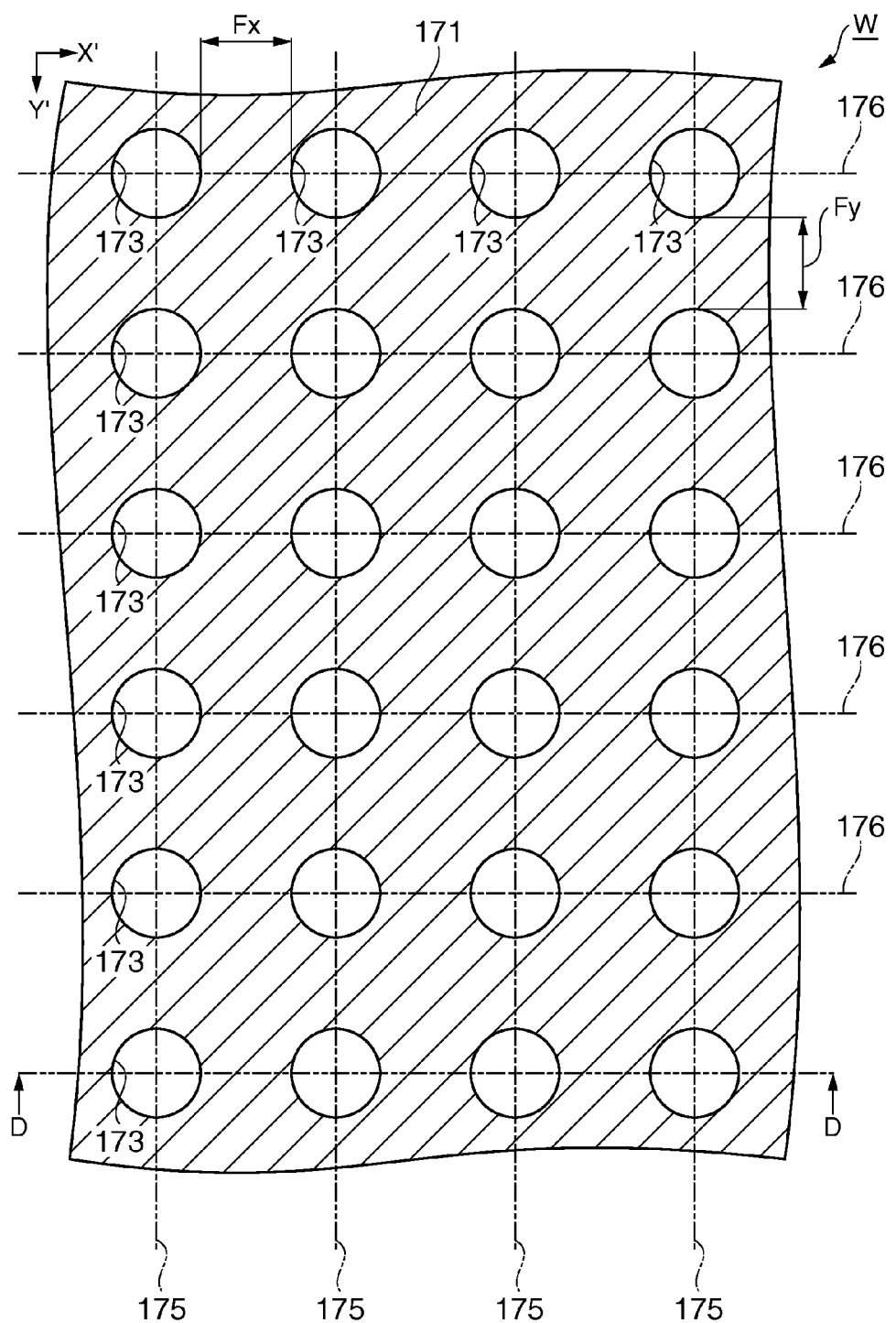
FIG. 16 is an enlarged plan view of apart of a drawing surface according to this embodiment.

According to this embodiment, on the substrate W, as shown in FIG. 16 that is an enlarged plan view of a part of the drawing surface 18, lyophilic areas 173 are disposed within the liquid repellent area 171. The liquid repellent area 171, as described above, is an area that represents liquid repellency for the functional liquid 53. The lyophilic area 173 is an area that represents a lyophillicity stronger than that of the liquid repellent area 171 for the functional liquid 53.

In this embodiment, a plurality of the lyophilic areas 173 is disposed. The plurality of the lyophilic areas 173 are independently formed in island shapes within the liquid repellent area 171. In FIG. 16, in order to represent the configuration to be more easily understood, hatching is added to the liquid repellent area 171.

In this embodiment, the plurality of the lyophilic areas 173 is arranged in the X' direction and the Y' direction. The X' direction and the Y' direction are directions intersecting each other and are not related to the X direction or the Y direction in the molding apparatus 5. In this embodiment, the X' direction and the Y' direction are perpendicular to each other.

A plurality of the lyophilic areas 173 arranged in the Y' direction configures a lyophilic column 175. A plurality of the lyophilic areas 173 arranged in the X' direction configures a lyophilic row 176.

A gap size Fx between the lyophilic areas 173 that are adjacent to each other in the X' direction is set to be equal to or less than 1.25 times the outer diameter of the liquid droplet 55. In addition, a gap size Fy between the lyophilic areas 173 that are adjacent to each other in the Y' direction is set to be equal to or less than 1.25 times the outer diameter of the liquid droplet 55.

First Embodiment

A method of forming the liquid repellent area 171 and the lyophilic areas 173 on the substrate W in the first embodiment will be described.

Figure 17:
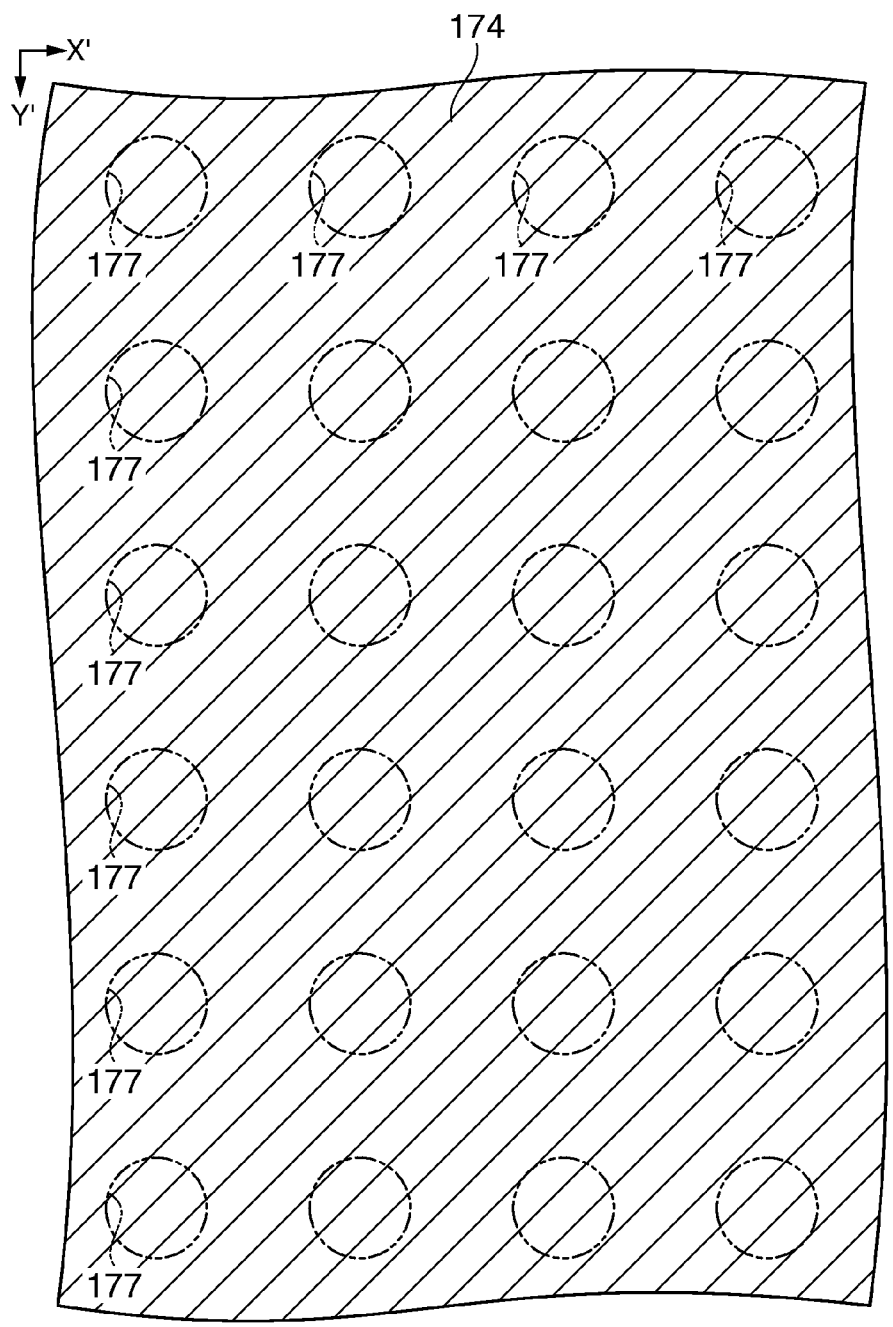
FIG. 17 is a diagram illustrating a method of forming a liquid repellent area and lyophilic areas on a substrate according to a first embodiment.

In the first embodiment, first, by coating the drawing surface 18 with a material containing a fluoroalkylsilane compound, a liquid repellent area 174 shown in FIG. 17 is formed. At this time, the liquid repellent area 174 includes a plurality of island-shaped areas 177. The island-shaped areas 177 are areas in which lyophilic areas 173 are to be respectively formed. In FIG. 17, in order to represent the configuration to be more easily understood, hatching is added to the liquid repellent area 174.

Next, by destroying the liquid repellency of the plurality of island-shaped areas 177, a plurality of lyophilic areas 173 shown in FIG. 16 is formed. As a method of destroying the liquid repellency of each of the plurality of island-shaped areas 177, a method of irradiation of ultraviolet light, a method of irradiation of laser beams, or the like may be used. At this time, it is preferable that ultraviolet light having a wavelength shorter than 200 nm is used as the ultraviolet light for irradiation. The reason for this is that the destruction of the liquid repellent area 171 caused by being irradiated with the ultraviolet light 163 in the above-described transfer process S3 can be easily suppressed.

As a result, the liquid repellent area 171 including the plurality of lyophilic areas 173 therein is formed.

Second Embodiment

Figure 18:
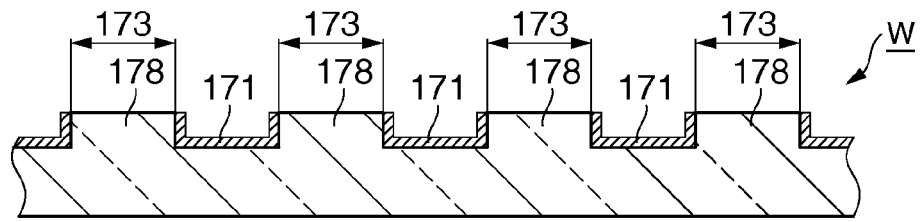
FIG. 18 is a cross-sectional view of a substrate according to a second embodiment, taken along line D-D shown in FIG. 16.

In a substrate W according to a second embodiment, as shown in FIG. 18 that is a cross-sectional view taken along line D-D shown in FIG. 16, a plurality of lyophilic areas 173 protrude from the liquid repellent areas 171. In other words, in the substrate W according to the second embodiment, a plurality of convex portions 178 is included. The top portion of each of the plurality of convex portions 178 is formed as the lyophilic area 173.

A method of manufacturing the substrate W according to the second embodiment will now be described.

Figure 19A:
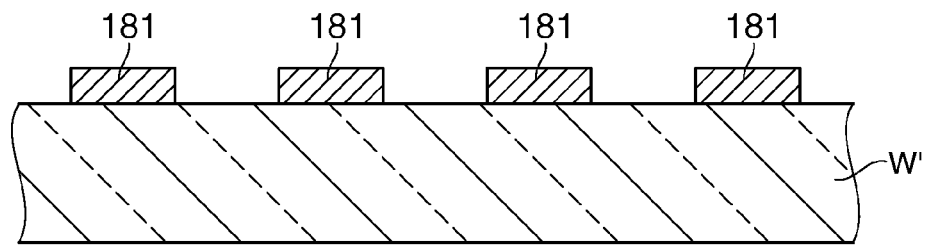
FIGS. 19A, 19B, and 19C are diagrams illustrating a method of manufacturing a substrate according to the second embodiment.

In the method of manufacturing the substrate W of the second embodiment, as shown in FIG. 19A, first, resist patterns 181 are patterned on a substrate W'. The substrate W' is a substrate that is the origin of the substrate W. The resist patterns 181 are disposed in positions corresponding to the convex portions 178 (FIG. 18). The resist patterns 181 can be patterned by using a spin coat technology, a photolithographic technology, and the like.

Figure 19B:
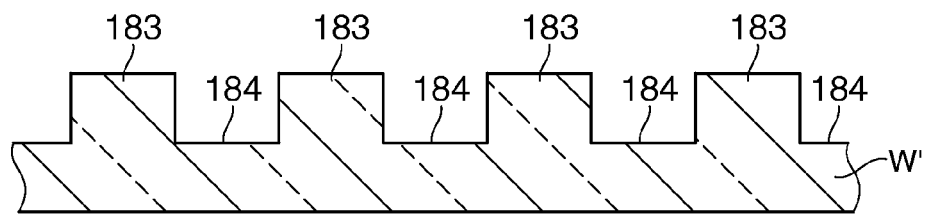

After the patterning of the resist patterns 181, by etching the substrate W', as shown in FIG. 19B, the plurality of convex portions 183 is formed. The plurality of convex portions 183 protrudes from the substrate surface 184. The convex portions 183 are portions that become convex portions 178.

Figure 19C:
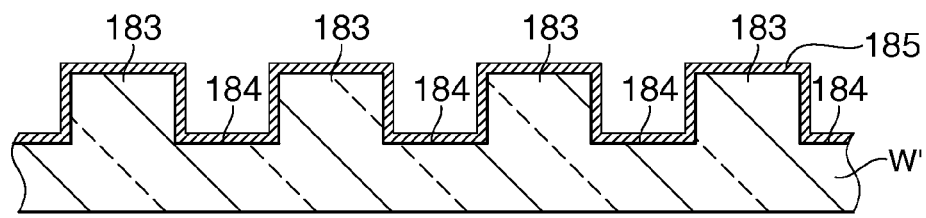

Next, by coating the resist patterns 181 and the substrate W' with a material containing a fluoroalkylsilane compound, as shown in FIG. 19C, a liquid repellent area 185 is formed on the substrate surface 184 and the convex portion 183. The liquid repellent area 185 includes the substrate surface 184, the top portion of the convex portion 183, and a side portion of the convex portion 183.

Next, by polishing the top portions of the plurality of the convex portions 183 by using a CMP (Chemical Mechanical Polishing) method or the like, a plurality of the convex portions 178 shown in FIG. 18 is formed.

Accordingly, the liquid repellent area 171 including a plurality of the lyophilic areas 173 therein is formed.

In this embodiment, a functional liquid 53 corresponds to a liquid, a substrate W corresponds to a drawing stand, a transfer plate 85 corresponds to a molding stand, and a transfer process S3 corresponds to applying of activation energy and detaching of the cross-section patterns. In addition, in the transfer process, the process of Step S53 corresponds to the applying of activation energy, and the process of Step S55 corresponds to the detaching of the cross-section patterns.

In addition, in each of the first embodiment and the second embodiment, the Y' direction corresponds to a first direction, the X' direction corresponds to a second direction, a lyophilic column 175 corresponds to a first arrangement, and a lyophilic row 176 corresponds to a second arrangement.

According to this embodiment, in the substrate W, the lyophilic areas 173 are independently disposed in island shapes within the liquid repellent area 171. Accordingly, when the drawing surface 18 is coated with the functional liquid 53, the functional liquid 53 can be maintained more easily in the lyophilic areas 173. Accordingly, the precision of the cross-section pattern at a time when the cross-section pattern is drawn on the liquid repellent area 171 with the functional liquid 53 can be easily increased. As a result, the precision of a three-dimensional object 7 can be easily increased.

In addition, in this embodiment, in the substrate W, a gap size Fx, and a gap size Fy are respectively set to be equal to or less than 1.25 times the outer diameter of a liquid droplet 55 ejected from the ejection head 33. Accordingly, when a liquid droplet 55 lands on a space between the lyophilic areas 173 adjacent to each other, a dot formed by the landed liquid droplet 55 can be easily maintained in a gap between the two lyophilic areas 173 that are adjacent to each other. Accordingly, the precision of the three-dimensional object 7 can be further easily increased.

Figure 20:
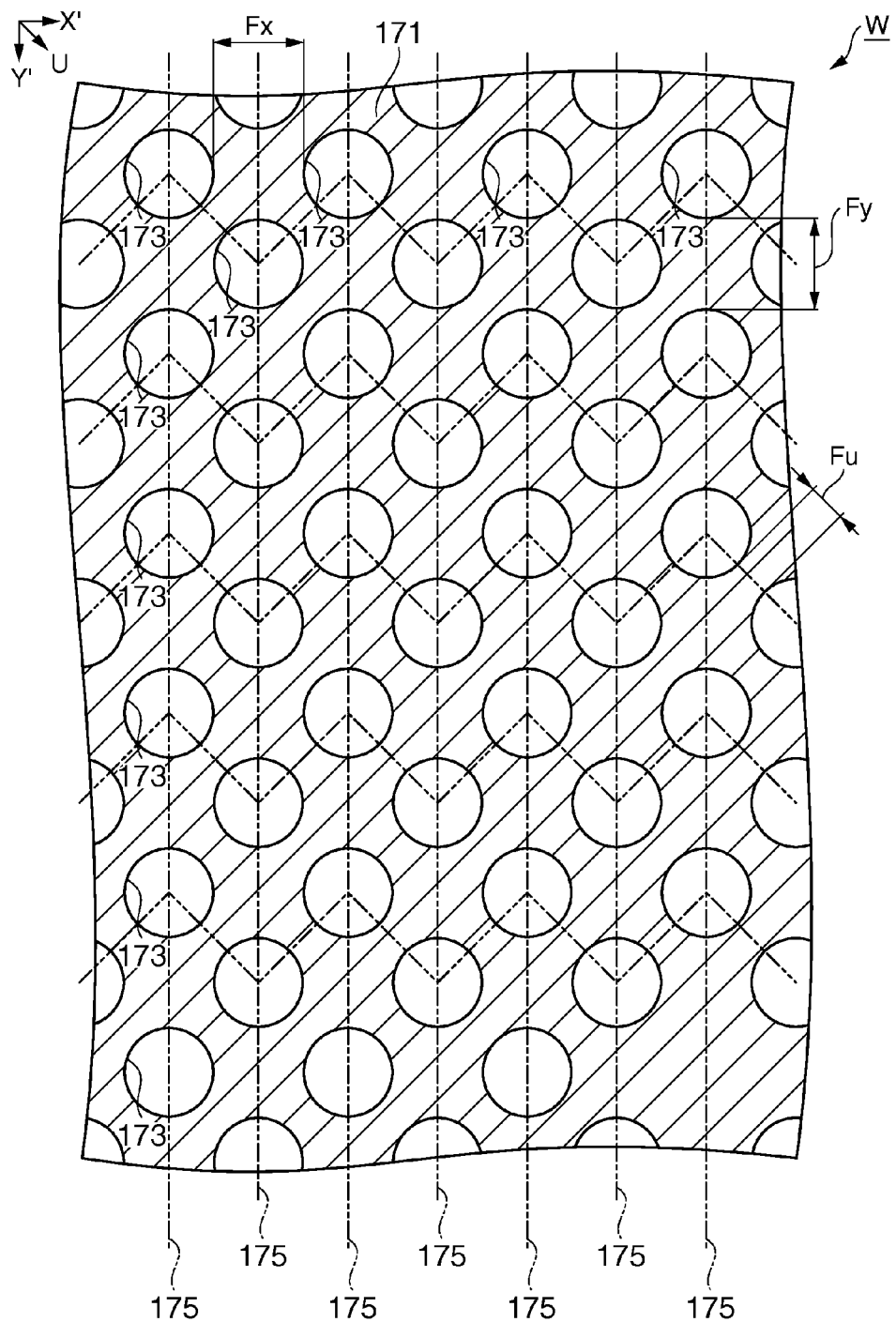
FIG. 20 is a plan view showing another example of an arrangement of a plurality of lyophilic areas according to each of the first and second embodiments.

In addition, in each of the first embodiment and the second embodiment, a plurality of the lyophilic areas 173 is arranged on the substrate W in the X' direction and the Y' direction. However, the arrangement of the plurality of the lyophilic areas 173 is not limited thereto. As the arrangement of the plurality of the lyophilic areas 173, for example, an arrangement in which a plurality of the lyophilic areas 173 is aligned in a zigzag pattern in the X' direction, as shown in FIG. 20, may be used. The arrangement shown in FIG. 20 is also referred to as a zigzag arrangement.

In the zigzag arrangement shown in FIG. 20, a plurality of the lyophilic columns 175 is aligned in a zigzag pattern in the X' direction. In addition, in the zigzag arrangement shown in FIG. 20, a plurality of the lyophilic columns 175 is aligned in the U direction. The U direction is a direction intersecting both the X' direction and the Y's direction.

In the zigzag pattern shown in FIG. 20, a gap between two lyophilic areas 173 adjacent to each other in the U direction can be set to be smaller than that of the arrangement shown in FIG. 16. Accordingly, when a liquid droplet 55 lands on a space between the lyophilic areas 173 adjacent to each other in the U direction, a dot formed by the landed liquid droplet 55 can be easily maintained in the gap between the two lyophilic areas 173 adjacent to each other. Accordingly, the precision of the three-dimensional object 7 can be further easily increased.

In addition, in the zigzag pattern shown in FIG. 20, it is preferable that a gap size Fu between the lyophilic areas 173 adjacent to each other in the U direction is set to be equal to or less than 1.25 times the outer diameter of a liquid droplet 55. Accordingly, when a liquid droplet 55 lands on a space between the lyophilic areas 173 adjacent to each other in the U direction, a dot formed by the landed liquid droplet 55 can be easily maintained in a gap between the two lyophilic areas 173 that are adjacent to each other in the U direction. Accordingly, the precision of the three-dimensional object 7 can be further easily increased.

In addition, in each of the first embodiment and the second embodiment, a plurality of the lyophilic areas 173 is arranged on the substrate W in the X' direction and the Y' direction. However, the arrangement form of the plurality of the lyophilic areas 173 is not limited thereto. As the arrangement form of the plurality of the lyophilic areas 173, for example, a form may be used in which the plurality of the lyophilic areas is arranged in a spiral shape using a Fibonacci sequence. The Fibonacci sequence is a numerical sequence configured by 1, 1, 2, 3, 5, 8, 13, 21, 34, 55, 89, . . . . When this is represented in a recurrence formula, the following Equation (1) is acquired.

$$f_1=1, f_2=1, f_{i+2}=f_{i+1}+f_i \quad (1)$$

When the angle of $(f_{i-1})/(f_{i+1}) \times 360$ degrees is represented in a numerical sequence, the value of the angle gets closer to a golden angle (137.5078 . . . ) as the value of increases.

In addition, on an X'Y' plane defined by the X' direction and the Y' direction, when the lyophilic area 173 is disposed at coordinates (x', y') calculated by using the following Equation (2), the plurality of the lyophilic areas 173 can be disposed in a spiral shape using a Fibonacci sequence.

$$x'=r \times \cos(\theta \times i), y'=r \times \sin(\theta \times i) \quad (2)$$

In Equation (2), θ is the value (137.5078 . . . ) of the golden angle. In addition, i is an integer equal to or higher than one. In addition, r is represented by the following Equation (3).

$$r = a \times \sqrt{(i)} \quad (3)$$

In Equation (3), a is a proportional constant and an arbitrary number greater than zero.

In the form in which a plurality of the lyophilic areas 173 is disposed in a spiral shape by using the above-described Fibonacci sequence, in a plurality of the lyophilic areas 173 overlapping an arbitrary straight line on the X'Y' plane, the regularity of the gaps between the lyophilic areas 173 adjacent to each other can be easily excluded. In other words, in the form in which a plurality of the lyophilic areas 173 is disposed in a spiral shape by using the above-described Fibonacci sequence, in a plurality of the lyophilic areas 173 overlapping an arbitrary straight line on the X'Y' plane, gaps between the lyophilic areas 173 adjacent to each other can be set to be irregular.

As a result, in the drawing process S2, even when a plurality of liquid droplets 55 regularly lands on the substrate W, generation of regular knurling shapes (jaggy shapes) in the cross-section pattern 165 can be easily suppressed to the low level due to irregularity of the plurality of the lyophilic areas 173.

In addition, also in this embodiment, in the drawing process S2, as a method of coating the functional liquid 53, an ink jet method that is one of the coating methods is used. However, the coating method is not limited to the ink jet method, and a dispensing method, a printing method, or the like may be used. However, it is preferable to use the ink jet method from the viewpoint that an arbitrary spot on the substrate W can be easily coated with a functional liquid 53 of an arbitrary amount.

In this embodiment, five types of color coating materials including yellow, magenta, cyan, black, and white are used. However, the colors of the color coating materials are not limited thereto. As the colors of the color coating materials, for example, one or more arbitrary types of color coating materials such as seven types acquired by adding light cyan and light magenta or the like to the above-described five types can be used.

In this embodiment, as activation energy that is used for precipitating the curing of the functional liquid 53, light is used. However, the activation energy is not limited thereto, and, for example, heat may be used. In other words, as the functional liquid 53, a functional liquid 53 having a thermosetting property that is a property, in which curing is precipitated in accordance with reception of heat, may be used.

In addition, in this embodiment, the configuration in which the molding apparatus 5 includes the substrate W is shown as an example. However, the configuration of the molding apparatus 5 is not limited thereto. As the configuration of the molding apparatus 5, for example, a configuration in which the substrate W is omitted may be used. In such a configuration, the cross-section pattern 165 is drawn on the table 25. Accordingly, in this configuration, the mounting surface 25a corresponds to a drawing surface 18. In addition, in the molding apparatus 5 that does not include the substrate W, the table 25 corresponds to a drawing stand.

The entire disclosure of Japanese Patent Application No. 2010-045000, filed Mar. 2, 2010 is expressly incorporated by reference herein.

What is claimed is:

1. A molding apparatus comprising:
an ejection head that ejects a liquid whose curing is precipitated by receiving activation energy;
a drawing stand that has a drawing surface on which cross-section patterns of a three-dimensional object as a molding target are drawn with the liquid ejected from the ejection head;
an energy applying device that applies the activation energy to the liquid adhering to the drawing surface; and a molding stand on which the cross-section patterns after being applied with the activation energy are transferred from the drawing stand;

wherein, on the drawing surface, a liquid repellent area is formed, the liquid repellent area has liquid repellency for the liquid, a plurality of projected lyophilic areas that are independently formed in an island shape within the liquid repellent area are arrange, the plurality of projected lyophilic areas protrude from the liquid repellant area, a lyophillicity of each top surface of the plurality of projected lyophilic areas is larger than a lyophillicity of the liquid repellent area and is larger than a lyophillicity of each side surface of the plurality of projected lyophilic areas, the ejection head ejects the liquid as a liquid droplet, and a distance between the plurality of projected lyophilic areas adjacent to each other is equal to or less than 1.25 times an outer diameter of the liquid droplet.

2. The molding apparatus according to claim 1, wherein the liquid has photo curability that is a property of being precipitated to be cured by receiving irradiation of light, and wherein the energy applying device irradiates the liquid with the light.

3. The molding apparatus according to claim 1, wherein the plurality of projected lyophilic areas configures a plurality of first arrangements arranged in a first direction in the plan view, and wherein the plurality of first arrangements is aligned in a second direction intersecting the first direction in the plan view.

4. The molding apparatus according to claim 1, wherein the plurality of projected lyophilic areas configures a plurality of first arrangements arranged in a first direction in the plan view, and wherein the plurality of first arrangements is aligned in a zigzag pattern in a second direction intersecting the first direction in the plan view.

5. The molding apparatus according to claim 1, wherein the plurality of projected lyophilic areas are arranged in a spiral shape using a Fibonacci sequence.

* * * * *